United States Patent
Hamano et al.

(10) Patent No.: US 8,432,586 B2
(45) Date of Patent: Apr. 30, 2013

(54) IMAGE READING APPARATUS

(75) Inventors: Shigemichi Hamano, Abiko (JP); Nobuo Sekiguchi, Moriya (JP); Akiko Kanno, Kashiwa (JP); Kenji Morita, Toride (JP); Satoshi Seki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 12/615,756

(22) Filed: Nov. 10, 2009

(65) Prior Publication Data

US 2010/0128331 A1 May 27, 2010

(30) Foreign Application Priority Data

Nov. 25, 2008 (JP) ................. 2008-300185

(51) Int. Cl.
*H04N 1/46* (2006.01)
*H04N 1/04* (2006.01)
*H04N 1/36* (2006.01)

(52) U.S. Cl.
USPC ........... 358/505; 358/514; 358/474; 358/483; 358/482; 358/412; 358/409; 358/496; 358/497

(58) Field of Classification Search .......... None
See application file for complete search history.

(56) References Cited

U.S. PATENT DOCUMENTS

| | | | |
|---|---|---|---|
| 6,377,705 B1 | 4/2002 | Sato et al. | 382/197 |
| 7,123,390 B2 * | 10/2006 | Sato | 358/505 |
| 7,782,500 B2 * | 8/2010 | Shiokawa et al. | 358/474 |
| 7,869,082 B2 * | 1/2011 | Hayashida et al. | 358/1.18 |

FOREIGN PATENT DOCUMENTS

| | | |
|---|---|---|
| JP | 6-152821 | 5/1994 |
| JP | 8-251355 | 9/1996 |
| JP | 2003-274115 | 9/2003 |
| JP | 2005-348171 | 12/2005 |
| JP | 2008147783 A * | 6/2008 |

* cited by examiner

*Primary Examiner* — Cheukfan Lee
(74) *Attorney, Agent, or Firm* — Fitzpatrick, Cella, Harper & Scinto

(57) ABSTRACT

Prior to reading an original image, whether to read the original image in a monochrome image mode in which the image reading apparatus reads the original image in use of the monochrome line sensor or a multi color image mode in which the image reading apparatus reads the original image in use of the multi color line sensor is predicted. Preparation of reading an original image based on parameters corresponding to the predicted mode is completed before the start of reading the original image. This arrangement reduces a time loss arising from switching of a color mode associated with a user color setting at the start of a job, and thus shortens the FCOT. This arrangement can shorten the time until the first copy is output after designating the start of copying when reading an original image based on different parameters.

7 Claims, 21 Drawing Sheets

| CCD CONTROL UNIT REGISTER ADDRESS | SETTING IN MONOCHROME IMAGE MODE | SETTING IN MULTI COLOR IMAGE MODE |
|---|---|---|
| 1000 | 0x0246 | 0x0123 |
| 1001 | 0x0323 | 0x0156 |
| 1002 | 0xFFFF | 0xFFFF |
| 1098 | 0x0444 | 0x0333 |
| 1099 | 0x0339 | 0x0232 |
| 1100 | 0x0400 | 0x01000 |
| 1600 | 1601 | 1602 |

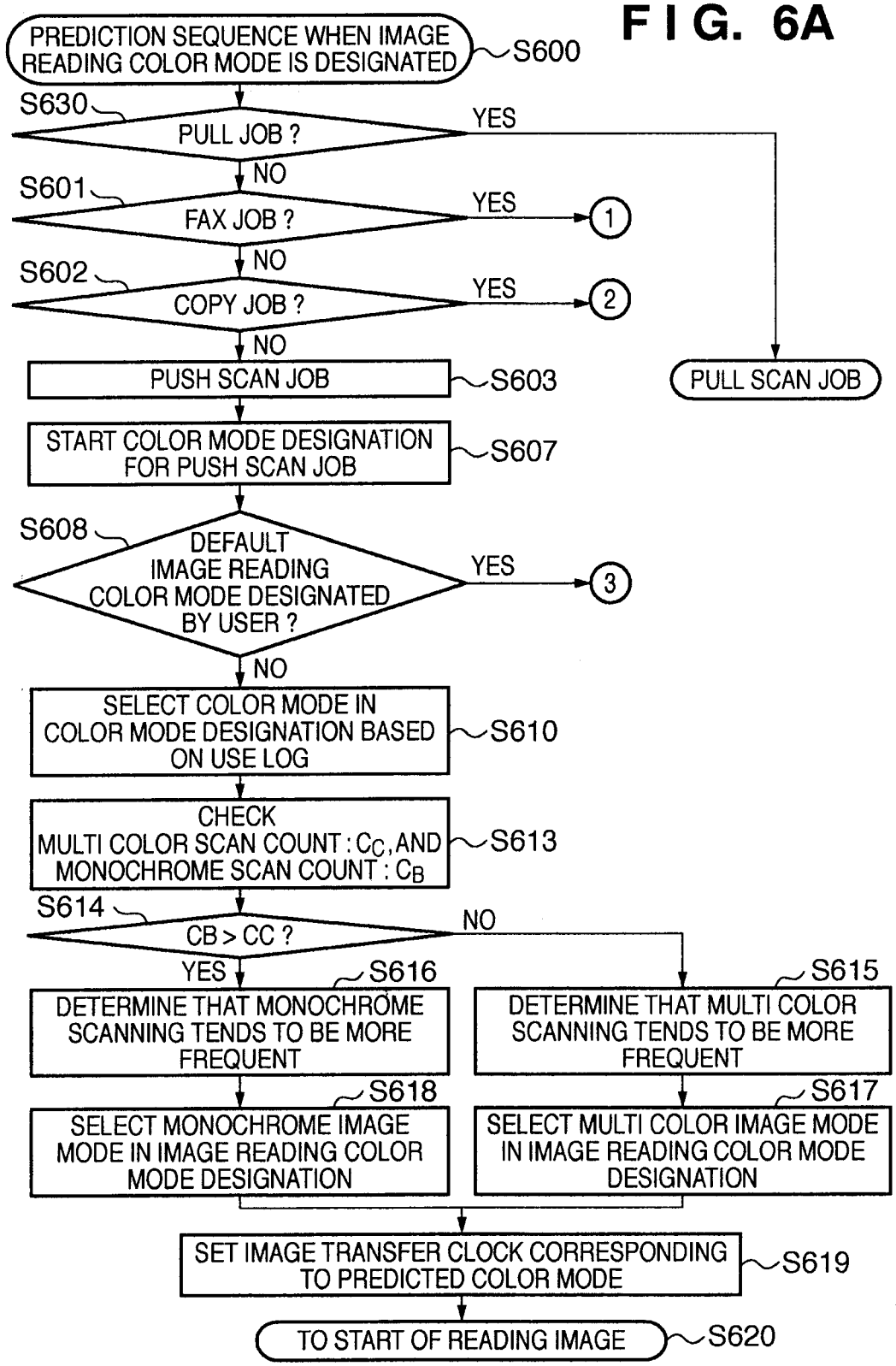

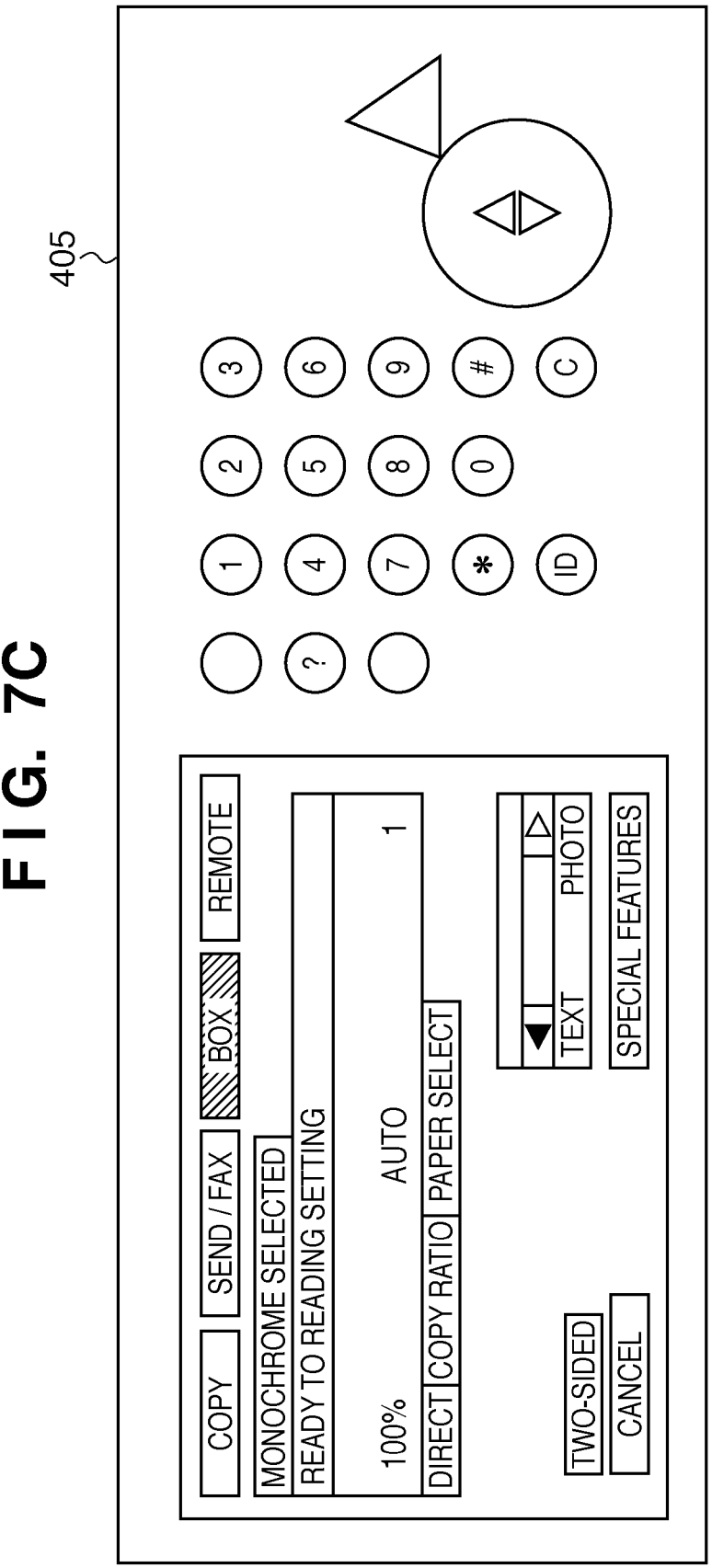

FIG. 9

PRIORITY COLOR MODE SETTING

- ■ SELECT MONOCHROME IMAGE MODE
- ☐ SELECT MULTI COLOR IMAGE MODE
- ☐ NOT DESIGNATE COLOR MODE

FIG. 10

SCAN COUNTER

MULTI COLOR   COUNT : 0000100

MONOCHROME COUNT : 0001000

[ PAST 100 SCAN JOBS ]

MULTI COLOR   COUNT : 0000070 ～$C_C$

MONOCHROME COUNT : 0000030 ～$C_B$

IMAGE READING APPARATUS

BACKGROUND OF THE INVENTION

1. Field of the Invention

The present invention relates to an image reading apparatus.

2. Description of the Related Art

An image reading apparatus such as a scanner has widely been used in a multifunction peripheral which converts image information of a read original into digital data and outputs the digital data to an image forming apparatus such as a printer or a storage device such as a computer connected to a network. Recently, a user need is arising for image reading apparatuses having a high productivity in image reading processing. Further, it is becoming an important specification for image reading apparatuses to have a short FCOT (First Copy Output Time) until the first copy is output after a reading start instruction.

Some conventional image reading apparatuses adopt an arrangement to set an image reading clock for each color mode when reading a monochrome image original, full-color image original, or the like. The image reading clock is set in accordance with the color mode. For example, a high-speed image reading clock is set in the monochrome image mode, realizing high-speed reading and high productivity in the monochrome image mode. For example, according to Japanese Patent Laid-Open No. 8-251355, pre-scanning is executed to determine a color mode. In actual scanning, different image reading clocks are set for the full-color image mode and monochrome image mode.

Image reading apparatuses of another type employ an arrangement not to perform pre-scanning by setting a constant reading speed and image transfer speed in both the monochrome image mode and full-color image mode. An image reading apparatus of this type executes image processing, including color mode determination of which of a monochrome or full-color image is read, extraction of a text, and extraction of image data of a picture. However, the image reading apparatus performs the same processing regardless of whether a read original image is a monochrome or full-color image.

Considering the user need for higher-productivity image reading processing, a specification to execute a high-speed reading operation in the monochrome image mode and a high-quality reading operation in the full-color image mode is examined as another user need. For image reading to meet this user need, there is an image reading apparatus with a line sensor arrangement made up of a total of four lines, for example, one line of a monochrome line sensor and three lines of full-color line sensors (RGB). For example, Japanese Patent Laid-Open No. 2003-274115 discloses setting of clocks in the full-color image mode and monochrome image mode in an image reading apparatus.

According to Japanese Patent Laid-Open No. 8-251355, clocks are set selectively in the full-color image mode and monochrome image mode. This image reading apparatus executes pre-scanning to detect a color mode before actual scanning for reading an image. The image clock is switched between the monochrome image mode and the full-color image mode. In this case, reading control can be optimized for each color mode. However, in terms of shortening the FCOT, it takes time to end reading because of redundant pre-scanning executed to specify a color mode.

According to Japanese Patent Laid-Open No. 2003-274115, the image clock is set in each color mode so that the monochrome line sensor reads an image at high speed in the monochrome image mode and the full-color line sensors read an image at high quality by in the full-color image mode. However, this reference does not mention a method of determining which sensor is used, and a setting timing to use each sensor.

To efficiently use each sensor, an image transfer clock needs to be set appropriately for each sensor. Even a time of about 0.1 sec greatly affects shortening the FCOT. If the image transfer clock is switched and set after designating the start of a job, the time required to switch the image transfer clock becomes non-negligible and may obstruct shortening the FCOT.

SUMMARY OF THE INVENTION

The present invention has been made to overcome the conventional drawbacks, and provides an image reading apparatus which includes a multi color line sensor and monochrome line sensor, and shortens the time until the first copy is output after designating the start of copying when reading an original image based on different parameters.

In order to solve the above problems, the present invention provides an image reading apparatus which includes a multi color line sensor and a monochrome line sensor and reads an original image based on parameters which are different between reading in use of the multi color line sensor and reading in use of the monochrome line sensor, the image reading apparatus comprising: a prediction unit configured to predict, prior to a start instruction for reading an original image, whether to read the original image in a monochrome image mode in which the image reading apparatus reads the original image in use of the monochrome line sensor or a multi color image mode in which the image reading apparatus reads the original image in use of the multi color line sensor; and a reading preparation unit configured to start preparation of reading the original image by the multi color line sensor without waiting for the start instruction for reading the original image in a case where the prediction unit predicts the multi color image mode and start preparation of reading the original image by the monochrome line sensor without waiting for the start instruction for reading the original image in a case where the prediction unit predicts the monochrome mode.

Also, the present invention provides an image processing apparatus comprising: an image reading apparatus as recited above; and an image forming apparatus which forms an image read by the image reading apparatus on a print medium.

Further, the present invention provides an image reading apparatus which includes a multi color line sensor and a monochrome line sensor and reads an original image based on parameters which are different between reading in use of the multi color line sensor and reading in use of the monochrome line sensor, the image reading apparatus comprising a reading preparation unit having a default setting to start preparation of reading by the monochrome line sensor without waiting for a start instruction for reading an original image when an operation job in the image reading apparatus is a copy job and an image forming apparatus connected to the image reading apparatus is a monochrome image forming apparatus, and start preparation of reading by the multi color line sensor without waiting for the start instruction for reading the original image when the operation job in the image reading apparatus is a copy job and an image forming apparatus connected to the image reading apparatus is a multi color image forming apparatus.

The present invention can provide an image reading apparatus which includes a multi color line sensor and monochrome line sensor, and shortens the time until the first copy is output after designating the start of copying when reading an original image based on different parameters.

More specifically, switching control of the image transfer clock is done by predicting which line sensor is to be used at the timing of key input by a user from an operation unit before the start of a job or the timing when an original is set on an automatic document feeder. The time until the first copy is output after designating the start of copying can be shortened without requiring the time to switch the image transfer clock after the start of a job.

Also in remote scanning by a host computer via a network, the host computer notifies the image reading apparatus of a reading mode before the start of reading. Then, the image reading apparatus executes switching control of the image transfer clock. The time until the first copy is output after designating the start of copying can be shortened without requiring the time to switch the image transfer clock after the start of a job.

Further features of the present invention will become apparent from the following description of exemplary embodiments with reference to the attached drawings.

BRIEF DESCRIPTION OF THE DRAWINGS

FIGS. 6A and 6B are a flowchart exemplifying a processing sequence when an image reading color mode is selected in the image reading apparatus according to the embodiment;

FIG. 7C is a view exemplifying the display screen of the operation unit used by a user to set a job mode in the image reading apparatus according to the embodiment;

FIG. 9 is a view for explaining an example of a screen to select and set an image reading color mode by a user in the image reading apparatus according to the embodiment;

FIG. 10 is a view for explaining the scan counts of the multi color image mode and monochrome image mode that are used to select an image reading color mode in the image reading apparatus according to the embodiment;

DESCRIPTION OF THE EMBODIMENTS

Preferred embodiments of the present invention will now be described in detail with reference to the accompanying drawings.

<Example of Arrangement of Image Reading Apparatus According to Embodiment>

Figure 1:
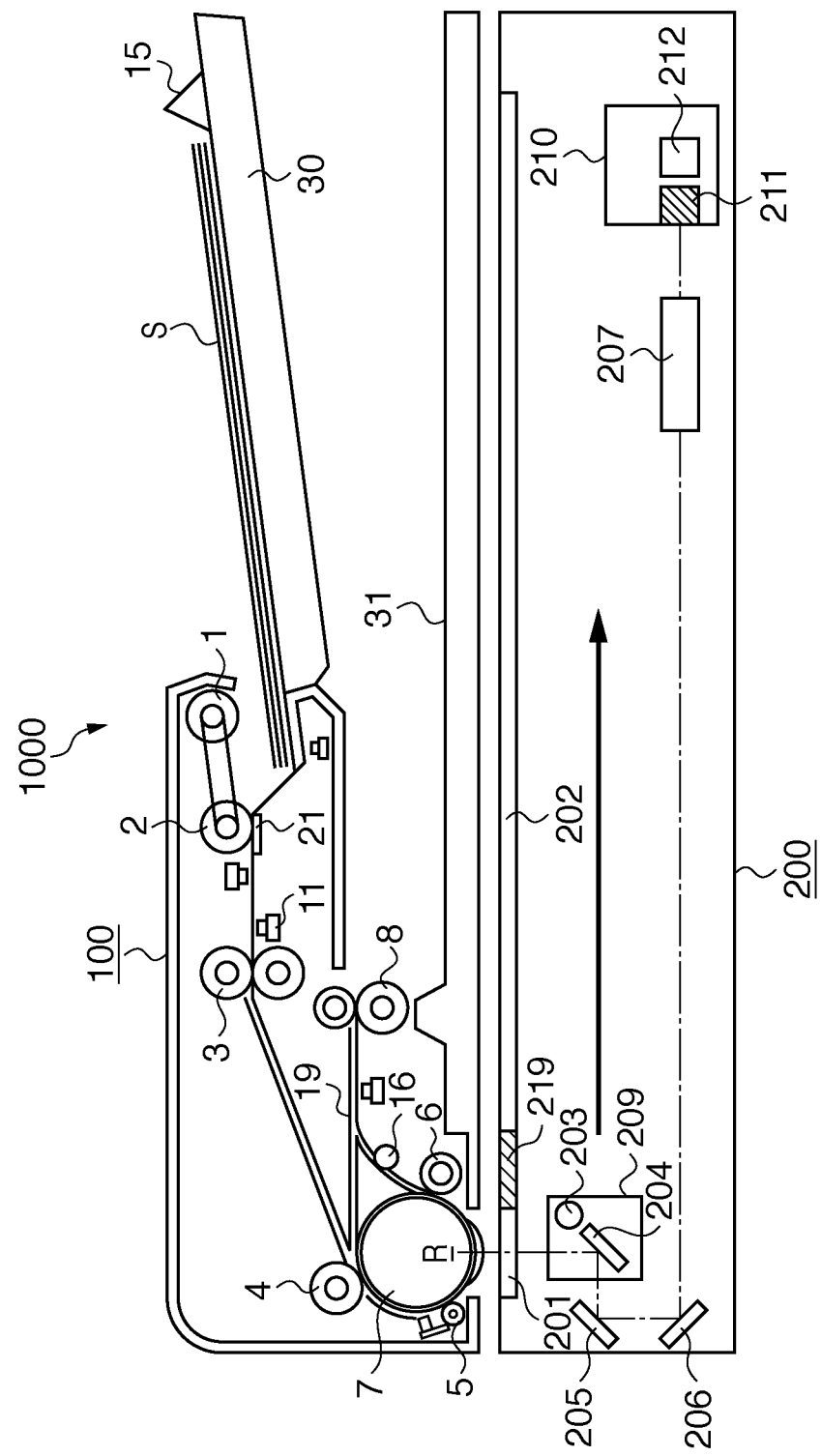
FIG. 1 is a sectional view exemplifying an image reading apparatus according to an embodiment.

FIG. 1 is a sectional view schematically exemplifying the arrangement of an image reading apparatus according to an embodiment.

An image reading apparatus 1000 according to the embodiment includes an image reading unit 200, an automatic document feeder (to be referred to as an ADF) 100, and a controller (not shown in FIG. 1).

(Example of Arrangement of Automatic Document Feeder (ADF) 100)

The operation of the ADF 100 will be explained with reference to FIG. 1. The ADF 100 shown in FIG. 1 includes an original tray 30 for supporting an original bundle S of one or more original sheets, a separation pad 21 which prevents the original bundle S from leaving the original tray 30 to the downstream before the start of conveying original sheets, and a pickup roller 1. The pickup roller 1 comes down to the original surface of the original bundle S stacked on the original tray 30, and rotates to pick up original sheets from the top of the original bundle. The original sheets picked up by the pickup roller 1 are separated one by one by the actions of a separation roller 2 and the separation pad 21. This separation is achieved by a well-known retard separation technique.

The original sheet separated by the separation roller 2 and separation pad 21 is conveyed to a registration roller 4 via a conveyance roller pair 3, and abuts against the registration roller 4. As a result, the original sheet forms a loop, canceling a skew of the conveyed original sheet. A paper feed path is arranged downstream of the registration roller 4 to convey an original sheet having passed through the registration roller 4 toward a flow reading glass 201.

The original sheet passing through the paper feed path is sent onto a platen via a large roller 7 and feed roller 5. The large roller 7 comes into contact with the flow reading glass 201. The original sheet fed by the large roller 7 passes through a conveyance roller 6, moves between a roller 16 and a moving glass, and is discharged to an original discharge tray 31 via a discharge flapper and a discharge roller 8.

The ADF 100 in FIG. 1 can read an image on the reverse side of an original sheet by reversing the original sheet. While gripping an original sheet, the discharge roller 8 rotates reversely. Then, the discharge flapper is switched to move the original sheet to a reversing path 19. The moved original sheet abuts against the registration roller 4 through the reversing path 19. The original sheet again forms a loop, canceling a skew of the conveyed original sheet. The feed roller 5 and large roller 7 move the original sheet again to the flow reading glass 201. The flow reading glass 201 can read the reverse side of the original sheet.

The original tray 30 includes a guide regulation plate 15 slidable in the sub-scanning direction of a stacked original bundle. The original tray 30 also includes an original width detection sensor (not shown) for detecting the original width in synchronism with the guide regulation plate. The original size of an original bundle on the original tray 30 can be determined by a combination of the original width detection sensor and a pre-registration sensor 11. An original length detection sensor (not shown) arranged on the conveyance path can detect an original length from a conveyance distance from a detected leading end to detected trailing end of a conveyed original sheet. The original size can also be determined by a combination of a detected original length and the original width detection sensor.

(Example of Arrangement of Image Reading Unit 200)

The image reading unit 200 optically reads image information recorded on an original sheet by scanning the original sheet on an original platen glass 202 by an optical scanner unit 209 in a sub-scanning direction indicated by an arrow in FIG. 1. Original sheets on the ADF 100 are conveyed one by one from the original tray 30 to a reading center position. Then, the optical scanner unit 209 moves to the reading center position of the large roller 7 of the ADF 100, and reads the original sheet at the reading center position of the large roller 7. The following optical system reads an original sheet on the ADF 100 or original platen glass 202. This optical system includes the flow reading glass 201, the original platen glass 202, the scanner unit 209 having a lamp 203 and mirror 204, mirrors 205 and 206, a lens 207, and a CCD sensor unit 210. The optical system photoelectrically converts read image information and inputs it as image data to the controller (not shown in FIG. 1). A white plate 219 is used to create reference data of white level by shading.

Figure 3:
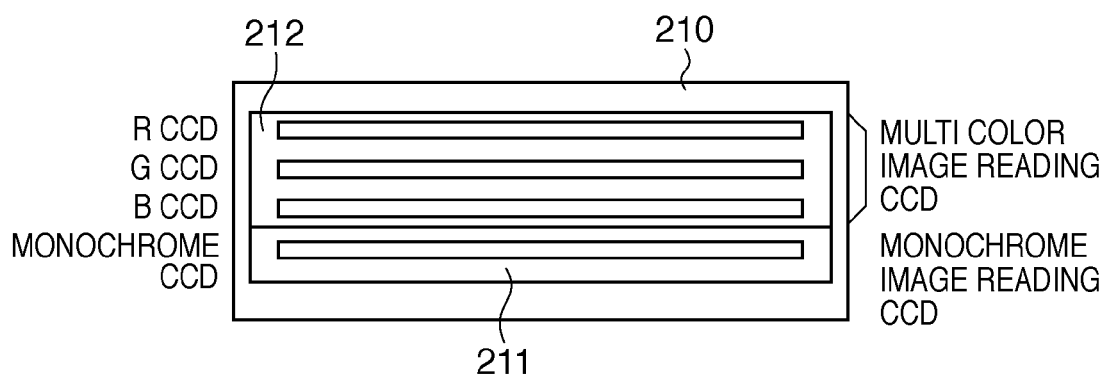
FIG. 3 is a view schematically showing a scanner unit incorporating a monochrome reading CCD and multi color reading CCD for reading an image in the image reading apparatus according to the embodiment.

In the embodiment, the CCD sensor unit 210 is formed from a multi color image reading (RGB) CCD (three line sensor units) 212 and a monochrome image reading CCD (one line sensor unit) 211, as shown in FIG. 3. An original having a multi color image can be read by the multi color image reading (RGB) CCD 212 with high image reproducibility. An original can be read by the monochrome image reading CCD 211 at a higher productivity (reading speed) of reading processing in accordance with the characteristic of the monochrome image reading CCD 211.

<Example of Arrangement of Control Unit of Image Reading Apparatus According to Embodiment>

Figure 2A:
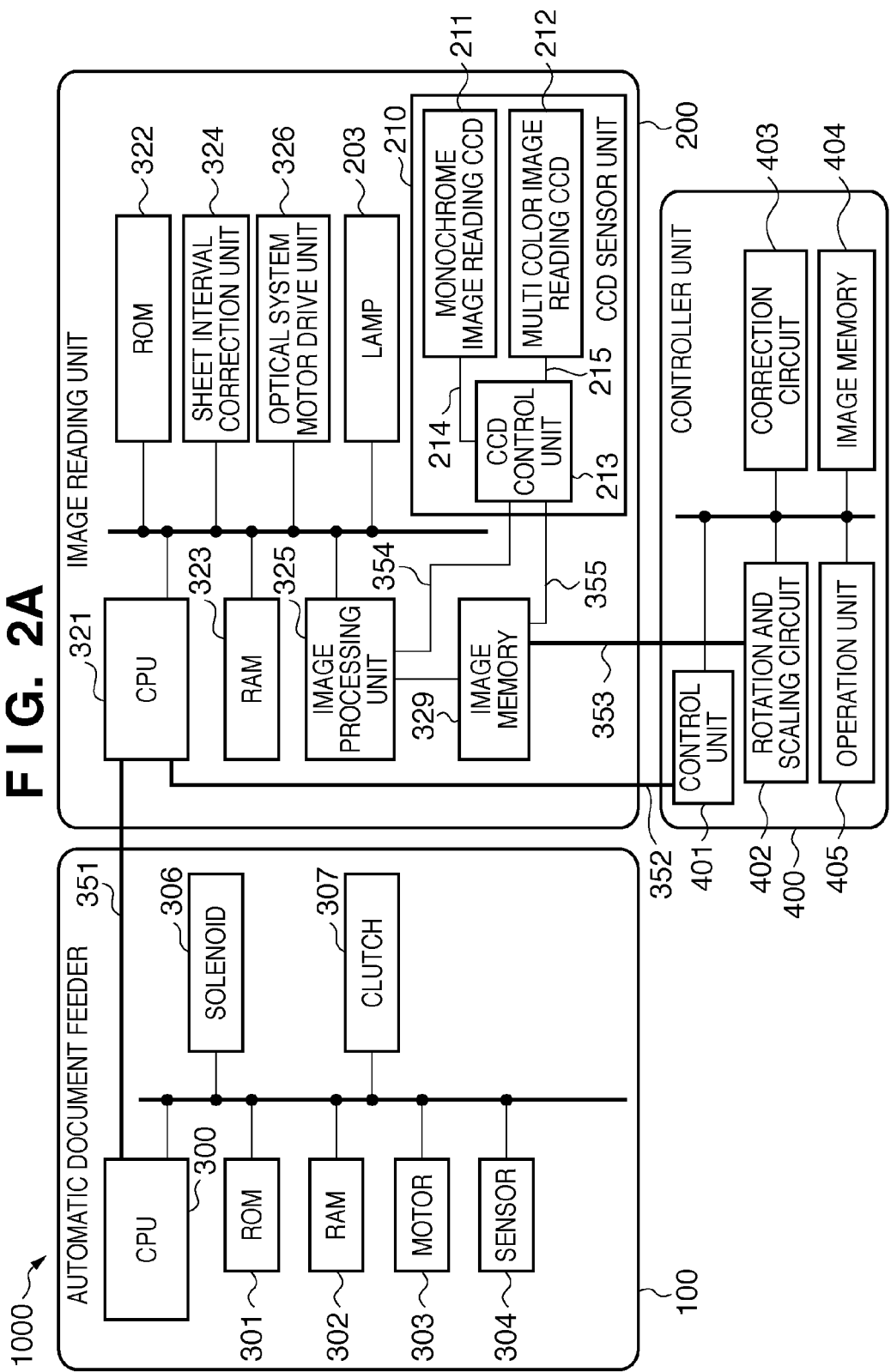
FIG. 2A is a block diagram exemplifying the arrangement of the control unit of the image reading apparatus according to the embodiment.

FIG. 2A is a block diagram exemplifying the arrangement of the control unit of the image reading apparatus according to the embodiment.

(Control Block of ADF 100)

The control block of the ADF 100 includes a control unit (to be referred to as a central processing unit: CPU) 300, a read only memory (to be referred to as a ROM) 301, a random access memory (to be referred to as a RAM) 302, an output port, and an input port. The ROM 301 stores control programs and permanent parameters, and the RAM 302 stores input data and working data.

A motor 303 for driving various kinds of conveyance rollers, a solenoid 306, and a clutch 307 are connected to the output port. A variety of sensors 304 (not shown) are connected to the input port.

The CPU 300 controls paper conveyance according to a control program stored in the ROM 301 connected via a bus line. The CPU 300 performs serial communication with a central processing unit (CPU) 321 of the image reading unit 200 via a control communication line 351, and exchanges control data with the image reading unit 200. The CPU 300 also notifies the image reading unit 200 via the control communication line 351 of an image start signal serving as a reference of the start of original image data.

(Control Block of Image Reading Unit 200)

In the control block of the image reading unit 200, the CPU 321 controls the overall image reading unit 200. The CPU 321 is connected to a ROM 322 which stores programs, and a RAM 323 which provides a work area. The work area in the RAM 323 includes a nonvolatile storage area, too. A large-capacity external storage such as a disk may be arranged separately from the RAM 323. In this case, a program may be loaded from the external storage into the RAM 323 and executed by the CPU 321.

An optical system motor drive unit 326 is a driver circuit for driving an optical system driving motor. In the image reading unit 200, the lamp 203 and the CCD sensor unit 210 (the monochrome image reading CCD 211 for an image on the obverse side and the multi color image reading CCD 212 for an image on the obverse side) are connected. The CPU 321 controls the optical system motor drive unit 326 and controls the CCD sensor unit 210 via an image processing unit 325, thereby executing image reading processing.

To convey paper, the CPU 321 instructs the paper conveyance control CPU 300 of the ADF 100 on paper conveyance control by sending a command to it via the control communication line 351 to control paper conveyance. Upon receiving the command, the CPU 300 monitors each sensor 304 installed on the conveyance path, and drives the conveyance motor 303, solenoid 306, and clutch 307 serving as loads, thereby performing paper conveyance. In this way, the CPU 321 performs paper conveyance by the ADF 100 and image reading control by the image reading unit 200. A sheet interval correction unit 324 corrects the interval between sheets.

An image signal generated on the CCD sensor unit 210 (either the multi color image reading (RGB) CCD 212 or monochrome image reading CCD 211) via the lens 207 is converted into digital image data. The converted image data undergoes shading by the image processing unit 325 and various image processes for detecting and correcting an image streak or the like in the image data. The processed image data is written in an image memory 329.

Data written in the image memory 329 are sequentially transmitted to a controller unit 400 via a controller/interface image communication line 353 including an image transfer clock signal line. After adjusting the timing, the CPU 321 notifies the controller unit 400 via a controller/interface control communication line 352 of an image start signal serving as a reference of the start of original image data. Similarly, after adjusting the timing, the CPU 321 of the image reading unit 200 notifies the controller unit 400 via the controller/interface control communication line 352 of an image start signal notified via a communication line running from the ADF 100.

The CPU 321 controls the image processing unit 325 connected to the control bus line. The CPU 321 controls the CCD sensor unit 210 by transferring a control signal from the image processing unit 325 to the CCD sensor unit 210 via a control communication line 354. While the CCD sensor unit 210 scans an original image, the multi color image reading CCD 212 or monochrome image reading CCD 211 reads it. An analog image signal of one read line is output to a CCD control unit 213 via an image data communication line 214 or 215 including an image transfer clock signal line.

The CCD control unit 213 converts an analog signal into digital image data. The CCD control unit 213 transmits the image data to the controller unit 400 by way of the image memory 329 through an image data information communication line 355 including an image transfer clock signal line.

(Control Block of Controller Unit 400)

The controller unit 400 for image processing controls the whole image reading apparatus 1000 including the image reading unit 200 and ADF 100. The controller unit 400 includes a control unit 401, a rotation and scaling circuit 402 for scaling, rotation, and the like, a correction circuit 403, an image memory 404, and an operation unit 405.

The rotation and scaling circuit 402 executes image control for image data transmitted to the controller unit 400 by way of the image memory 329 through the image data information communication line 355. The rotation and scaling circuit 402 transmits the resultant image data to the correction circuit 403. The correction circuit 403 performs correction processing for the image data and writes the processed image data in the image memory 404. Image data in the original image region undergoes these processes, generating the read image of the original.

<Example of Data Used in Embodiment>

Figure 2B:
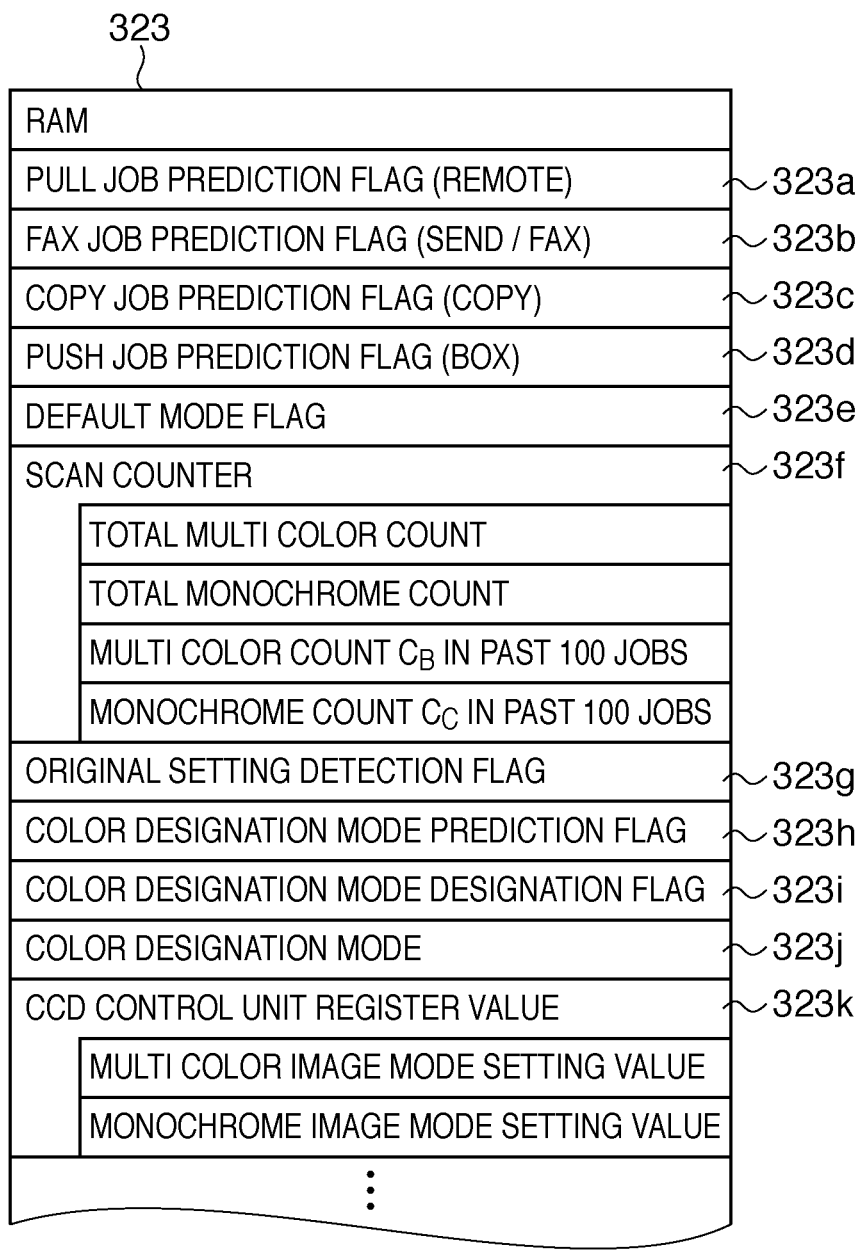
FIG. 2B is a view exemplifying the structure of the RAM of an image reading unit according to the embodiment.

FIG. 2B is a view exemplifying data which is stored in the RAM 323 of the image reading unit 200 and used to switch and set an image transfer clock in the embodiment. FIG. 2B shows only data specific to the embodiment and does not illustrate general-purpose data.

Referring to FIG. 2B, an area 323*a* stores "remote" selected in the operation unit 405 as the start of a PULL scan job and a prediction flag thereof. An area 323*b* stores "send/FAX" selected in the operation unit 405 as the start of a FAX job and a prediction flag thereof. An area 323*c* stores "copy" selected in the operation unit 405 as the start of a copy job and a prediction flag thereof. An area 323*d* stores "box" selected in the operation unit 405 as the start of a PUSH scan job and a prediction flag thereof.

An area 323*e* stores whether a default mode of high priority is set, and when it is set, which of the multi color image mode and monochrome image mode is set as the default mode (see FIG. 9). A scan counter area 323*f* separately stores, as image reading operation counts (scan counts), the total multi color and monochrome counts, and multi color and monochrome counts in the past 100 image reading operations. An area 323*g* stores the result of detecting whether an original is set on the ADF 100.

An area 323*h* stores the result of predicting, before image reading in the embodiment, which of the multi color image mode and monochrome image mode is set as a color designation mode. An area 323*i* stores a color designation mode designated by the operation unit 405 of the controller unit 400 or an external host computer. An area 323*j* stores a currently set color designation mode.

An area 323*k* stores a CCD control unit register value as a parameter set in the CCD control unit 213 (to be described later with reference to FIG. 4B) to control the frequency of the image transfer clock in correspondence with the color designation mode.

<Example of Arrangement of CCD Sensor Unit 210>

FIG. 3 is a view exemplifying the arrangement of the CCD sensor unit 210.

As shown in FIG. 3, an image can be read using the CCD sensor unit 210 (monochrome image reading CCD 211 and multi color image reading CCD 212). The monochrome image reading CCD 211 is formed from a line sensor of one line, and the multi color image reading CCD 212 is formed from line sensors of three lines for R, G, and B.

In the embodiment, the CPU 321 controls the CCD sensor unit 210 via the image processing unit 325 to control the monochrome image reading CCD 211 and multi color image reading CCD 212 having different settings. In practice, the image processing unit 325 controls the CCD sensor unit 210 by controlling the monochrome image reading CCD 211 and multi color image reading CCD 212 via the CCD control unit 213 incorporated in the CCD sensor unit 210.

<Example of Transfer of Read Image According to Embodiment>

Image transfer from the image reading unit 200 to the controller unit 400 will be explained in detail as processing associated with the embodiment.

(Outline of Switching of Color Mode According to Embodiment)

Figure 4A:
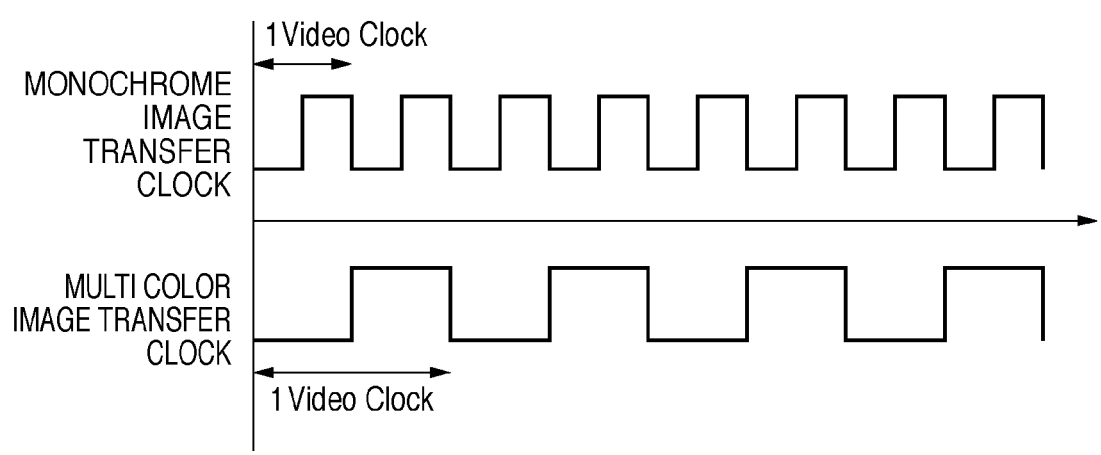
FIG. 4A is a timing chart for explaining image transfer clocks respectively when a multi color image mode and monochrome image mode are selected in the image reading apparatus according to the embodiment.

The aforementioned image transfer clock used to transfer an image is set to have different frequencies between a multi color image and a monochrome image, as shown in FIG. 4A. The frequency of an image transfer clock for a monochrome image is set greatly different from that for a multi color image to read a monochrome image at high speed and a multi color image at high quality.

When outputting image data from the CCD sensor unit 210, image transfer clocks are set respectively for the monochrome image reading CCD 211 and multi color image reading CCD 212. If each sensor used requires a setting different from the setting content of an image transfer clock already set in the CCD sensor unit 210, the setting needs to be switched for the sensor.

Figures 4B, 4C:
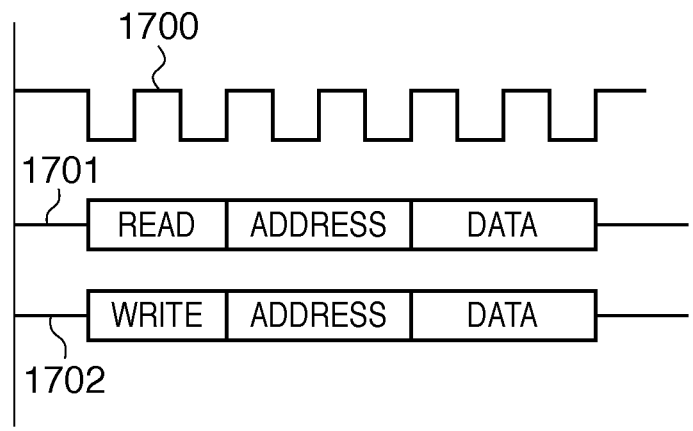
FIG. 4B is a table for explaining an example of the register map of a CCD control unit according to the embodiment.
FIG. 4C is a conceptual view for explaining an example of serial transfer to the CCD control unit according to the embodiment.

FIG. 4B exemplifies the register map of the CCD control unit 213. The register of the CCD control unit 213 is used to set details of the operation of the CCD control unit 213. Based on the register setting, the CCD control unit 213 drives the monochrome and multi color CCDs. In detailed operation setting of the CCD control unit 213, an image transfer clock to be described below is set for the signal section, signal output ON/OFF section, or the like. Additionally, detailed settings for a series of CCD control operations are made, including ON/OFF switching setting of basic CCD driving, main scanning section length setting of CCD control, and monochrome CCD/multi color CCD selection setting. With these settings, the CCD is driven.

As shown in the example of FIG. 4B, the CCD control unit 213 operates at an image transfer clock corresponding to a value set in the register concerning the image transfer clock setting. As represented by the register map, the monochrome and multi color image modes have different settings at a plurality of register addresses. The image transfer clock can be switched only after a setting value suited to each color mode is set in the register. When the setting needs to be switched, the CPU 321 controls the CCD sensor unit to switch the image transfer clock.

The register can be accessed in two ways:

(1) An address bus and data bus are laid from the CPU 321 to set an address and data in the register of the CCD control unit 213 in synchronism with a high-speed bus clock.

(2) Addresses and data in the register of the CCD control unit 213 are sequentially transferred and set by serial transfer.

In case (1), data can be set quickly in the register of the CCD control unit 213 in synchronism with a high-speed bus clock. Although data complies with the data bus width, data of one address can be transferred in one bus clock cycle. In case (2), data are transmitted bit by bit to the CCD control unit 213 in synchronism with a serial transfer clock 1700 because of serial communication, as shown in FIG. 4C. As for the transmitted data amount, pieces of control information on the mode (read/write), address, data, and transfer setting are transmitted sequentially in both read access 1701 to the register and write access 1702 to the register. This takes a longer time as compared to transfer using the address bus and data bus in case (1).

However, in case (1), a high-frequency signal used as a control signal passes through a bus line formed from a plurality of communication lines. This signal may generate noise depending on the arrangement including the layout and length of the bus line, adversely affecting the S/N ratio of image data and the like. If the CCD sensor unit 210 in FIG. 1 is connected by assembling it into the scanner unit, the CCD sensor unit 210 is also scanned simultaneously. In this arrangement, a bus line running to the CCD sensor unit 210 becomes long, and it becomes difficult to lay out the bus line.

To minimize the cost to avoid these problems and maximize the advantages of the arrangement, it is appropriate in the embodiment to control the CCD control unit 213 by serial communication via the image processing unit 325. As described above, the image transfer clock can be switched only after setting color mode data at a plurality of register addresses in a register map as shown in FIG. 4B. To switch and set the image transfer clock, each job requires a time of 0.1 to 0.2 sec at the serial transfer setting. The time of 0.1 to 0.2 sec necessary to set and switch the image transfer clock to the CCD control unit 213 for a switched color mode may obstruct shortening the FCOT. The embodiment will explain in detail this problem which bottlenecks a shorter FCOT.

As for the light quantity, reading a monochrome image and reading a multi color image require different light quantities. A light quantity necessary to read a multi color image is larger than that necessary to read a monochrome image. A charge accumulation period necessary for the multi color line sensor is longer than that necessary for the monochrome line sensor. The controller unit 400 takes a long time to perform various image processes for three color image data of R, G and B signals of a multi color image. In contrast, the controller unit 400 can quickly execute various image processes for a monochrome image because one color signal processing suffices. Image data can therefore be transferred to the controller unit 400 at higher speed upon reading by the monochrome image reading CCD 211 in comparison with reading by the multi color image reading CCD 212. To exploit the processing characteristics of a monochrome image, an image transfer clock for transferring monochrome image data is set higher than that for transferring multi color image data.

In the embodiment, an image reading speed and image transfer clock in the monochrome image reading mode are set higher than those in the multi color image mode. The monochrome image CCD 211 uses an image transfer clock set differently from that for reading by the multi color image reading CCD 212 (FIG. 4A). The image transfer clock is different between the monochrome image reading CCD 211 and multi color image reading CCD 212 use different. The reading speed is also different between multi color image reading and monochrome image reading. Hence, it becomes necessary to set a reading speed and image transfer clock corresponding to each color mode. When setting a reading speed and image transfer clock for a monochrome image while those for a monochrome image have already been set, they need not be set again. To the contrary, when setting a reading speed and image transfer clock for a monochrome image while those for a multi color image have been set, they need to be set again.

Switching of the setting requires the setting time including the re-setting time of the CCD control unit 213, as described above. The switching and re-setting operation executed at the start of a job obstructs shortening the FCOT.

To solve this problem, the embodiment switches the image transfer clock and image reading speed at the timing of key input setting by the user from the operation unit 405 immediately before inputting a job. Only after switching the image transfer clock and image reading speed, a job can start to perform normal shading processing and the like before reading.

(Example 1 of Color Mode Switching According to Embodiment: Reading Preparation Processing on Power-On Time)

As shown in FIG. 3, the CCD sensor unit 210 in the embodiment includes two types of sensors, that is, the multi color image reading CCD 212 and monochrome image reading CCD 211. The respective sensor units operate at different settings, so initial adjustment control on start-up immediately after power-on needs to be done for each sensor.

Figure 5:
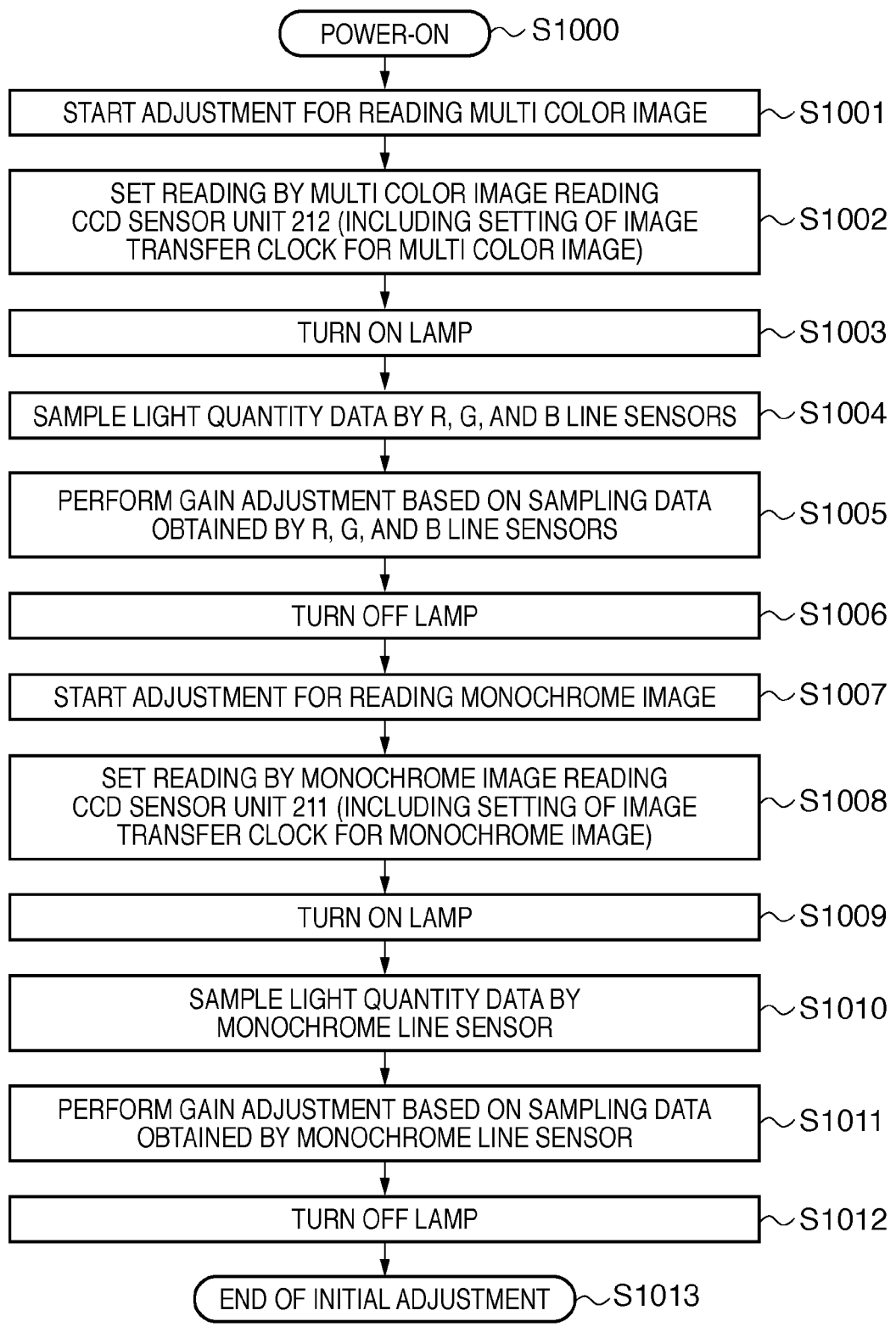
FIG. 5 is a flowchart exemplifying a sensor initial adjustment sequence on power-on time in the image reading apparatus according to the embodiment.

FIG. 5 is a flowchart exemplifying the sequence of reading preparation processing on power-on time.

The image reading unit 200 is turned on (S1000). The CPU 321 starts multi color image reading adjustment (S1001). For data sampling, the scanner unit 209 moves to a position immediately below the shading white plate 219 of the image reading unit 200.

To read a multi color image, the multi color image reading CCD 212 executes reading setting (S1002). Among reading settings for reading a multi color image, the above-mentioned image reading speed and image transfer clock for reading a multi color image need to be set. After making the settings for a multi color image, gain adjustment control and the like to be described below become possible.

After making the multi color image reading settings (S1002), the lamp is turned on (S1003). The multi color image reading CCD 212 samples light reflected by the shading white plate 219 as light quantity data (S1004). The sampling data is compared with a target value of reference shading data. Sampling is repeated while changing the light quantity by gain adjustment until the sampling data reaches the target value of reference shading data. A gain adjustment value obtained when the sampling data reaches the target value of reference shading data is backed up (S1005). After the end of the gain adjustment for reading a multi color image, the lamp is turned off (S1006).

Then, adjustment for reading a monochrome image starts (S1007). To read a monochrome image, reading settings are made for the monochrome image reading CCD 211 (S1008). As described above in the multi color image reading setting, an image reading speed and image transfer clock for reading a monochrome image need to be set in monochrome image reading setting. Only after setting an image reading speed and image transfer clock for reading a monochrome image, gain adjustment control and the like to be described below become possible. After executing the monochrome image reading setting (S1008), the lamp is turned on (S1009). The monochrome image reading CCD 211 samples light reflected by the shading white plate 219 as light quantity data (S1010). The sampling data is compared with a target value of reference shading data. Sampling is repeated while changing the light quantity by gain adjustment until the sampling data reaches the target value of reference shading data. A gain adjustment value obtained when the sampling data reaches the target value of reference shading data is backed up (S1011). After the end of the gain adjustment for reading a monochrome image, the lamp is turned off (S1012).

After the end of the gain adjustment for reading multi color and monochrome images, the initial adjustment ends (S1013).

In the flowchart of FIG. 5, multi color image reading adjustment is executed in advance. In some cases, however, it is convenient to reverse the sequence of multi color image reading adjustment and monochrome image reading adjustment in accordance with the reading color mode designation. This is because color switching setting can be omitted at the start of a job immediately after adjustment.

Image reading settings for each color mode include the image reading speed setting and image transfer clock setting in correspondence with each color mode designation. If the default value of color mode designation is the monochrome image mode, initial adjustment for the multi color image mode precedes that for the monochrome image mode in initial adjustment control on power-on time. In this case, the adjustment control ends when an image reading speed and image transfer clock for the monochrome image mode are set finally. When the monochrome image mode is designated at the start of reading, a job can start without setting the image reading speed and image transfer clock again for the monochrome image mode.

If the default value of color mode designation is the multi color image mode, initial adjustment for the monochrome image mode precedes that for the multi color image mode in initial adjustment control on power-on time. In this case, the adjustment control ends when an image reading speed and image transfer clock for the multi color image mode are set finally. When the multi color image mode is designated at the start of reading, a job can start without setting the image reading speed and image transfer clock again for the multi color image mode.

In this manner, initial adjustment on power-on time is performed in accordance with the default setting of the color mode. Immediately after power-on, a job can start without color switching setting, and the FCOT immediately after power-on can be shortened.

The processing to determine the default setting of the color mode is done immediately after power-on in FIG. 5. Based on the determination result, the processing in FIG. 5 changes. More specifically, if the default setting (323e in FIG. 2B) is the monochrome image mode, initial adjustment is done according to the sequence of FIG. 5. If the default setting is the multi color image mode, S1007 to S1012 are executed first and then S1001 to S1006 are done in the sequence of FIG. 5.

(Prediction of Image Reading Color Mode and Clock Switching Timing)

When starting each reading mode as described above, the color mode of an original to be read is finalized, and the image reading speed and image transfer clock are switched in accordance with the color mode immediately before the start of an image reading job. As a result, the time (FCOT) till the completion of printout after the start of copying by a copy job can be shortened unless the image reading speed or image transfer clock is not switched in accordance with the color mode immediately after the start of the copy job.

In the embodiment, designated color modes are
 a monochrome image mode using the monochrome image reading CCD 211, and
 a multi color image mode using the multi color image reading CCD 212.

As shown in FIG. 4A, the image transfer clock to the controller is fast in the monochrome image mode, and a short FCOT can be expected for a monochrome image. The monochrome image mode is optimum for a user who wants to obtain a printout as quick as possible even if the printout is monochrome. An image reading apparatus convenient for a user can be provided if the monochrome image mode can be selected according to usability, application purpose, apparatus configuration, and the like.

Before describing the timing to designate a color mode, a general case in which the image reading unit 200 is used will be examined. More specifically, the image reading unit 200 assumes four use cases (operation jobs):

(1) The image reading unit 200 is used as a copying apparatus to copy an original.

(2) The image reading unit 200 is used as a FAX apparatus to output image data to a printout apparatus via a network line or telephone line.

(3) The image reading unit 200 scans an original bundle and holds it as an image data file in accordance with designation from the operation unit (this will be called a PUSH scan function).

(4) The image reading unit 200 scans an original bundle and holds it as an image data file in response to an image reading request from a terminal such as a host computer (PC) or the like connected to a network line (this will be called a PULL scan function).

Case (1) can be assumed depending on whether the printout apparatus is a monochrome printer (monochrome image forming apparatus) or a full-color printer (multi color image forming apparatus). In case (2), a destination printout apparatus is generally a monochrome printer. In case (3), image data may be printed out later, but it is popular to refer to a file from a personal computer or the like and read an original in the multi color image mode. Cases (1) to (3) are directed to functions to start a job from the operation unit. In contrast, case (4) concerns a function to start a job via a network line from a PC terminal connected to the network line. The use of this function is similar to case 2A.

The timing to designate an image reading color mode when using the image reading unit 200 in cases (1) to (4) will be examined. There is a timing of work the user always executes commonly when using the copying apparatus in cases (1) to (4). This is the timing of a key input operation from the operation unit 405 shown in FIG. 3 to make various detailed settings in the respective processing modes of cases (1) to (4) immediately before the start of an image reading job.

The kind of job (facsimile job/copy job/PUSH scan job: box job) is predictively determined from the screen setting (see FIGS. 7A to 7D) of the operation unit 405 to which the user inputs a key. If a color mode suitable for the reading mode of a job can be specified before the start of a job, no color mode need be switched immediately after the start of the job. The FCOT can be shorted if switching setting of the image transfer clock and image reading speed corresponding to the specified color mode ends before the start of a job. In particular, the processing speed for a monochrome image is higher than that for a multi color image. If the monochrome image mode can be specified properly by predictive determination, no color mode switching is done immediately after the start of a job. Accordingly, a shorter FCOT in the monochrome image reading mode can be expected.

The image reading color mode can also be predicted at the timing, used as a trigger, when an original is set on the original tray 30 of the ADF 100, in addition to a key input operation from the screen of the operation unit 405. The FCOT can be shortened by ending switching setting of the image transfer clock and image reading speed corresponding to the color mode before the start of copying.

(Example 2 of Color Mode Switching According to Embodiment: Color Mode Prediction Based on Key Input to Operation Unit)

How to select an image reading color mode designated at the timing of key operation input will be explained. As described above, the image reading color mode is predictively determined by, for example, selecting an image reading color mode which is highly likely to be used based on an apparatus configuration including a printer, functional usability, the use log of an actually used image reading color mode, and the like.

The image reading color mode can be specified appropriately to match a color mode at the start of a job. As long as the color mode can be switched and set before the start of a job, the time to change settings along with switching of the color mode can be omitted at the start of the job. As a result, a copying apparatus with a short FCOT can be provided.

Figure 6B:
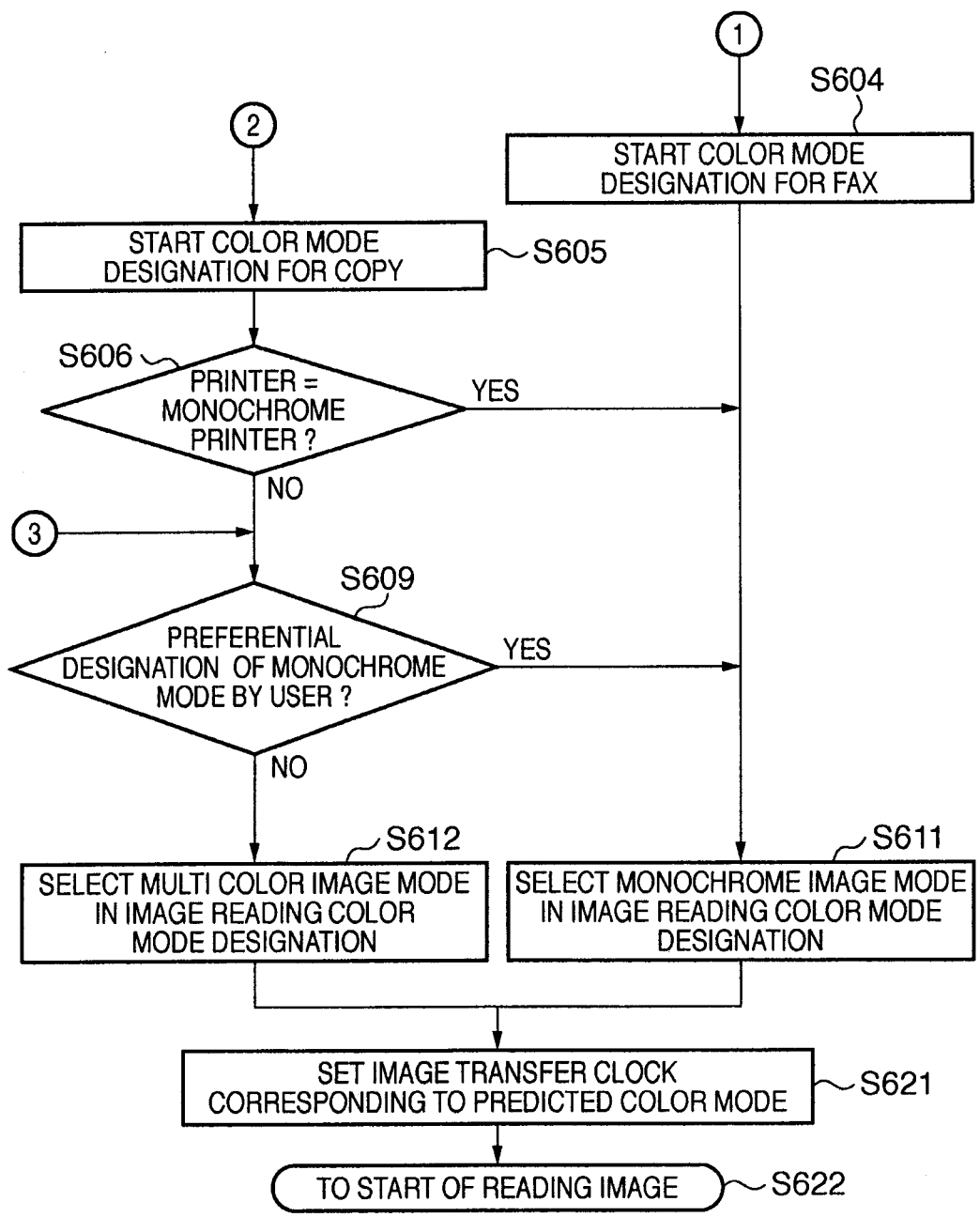

FIGS. 6A and 6B are a flowchart exemplifying the sequence of image reading color mode prediction and switching setting processing at the timing of key operation input. As for the above-described PULL scan in case (4), the start of a job is designated from a terminal such as an external host computer connected by a network line or the like. This job setting method differs from the use methods in cases (1) to (3). Thus, the description of FIGS. 6A and 6B applies to cases (1) to (3), and details of case (4) will be described separately.

The display screen of the operation unit 405 shown in FIGS. 7A to 7D is used to make various mode settings at the start of a job, including reading the user wants. The image reading unit 200 is connected to the controller unit 400, and the control unit 401 determines setting information input with a key from the operation unit 405.

The control unit 401 of the controller unit 400 detects a key input from the screen (FIGS. 7A to 7D) of the operation unit 405. Based on the detection result of the control unit 401, the image reading unit 200 predictively determines a job mode (copy job, facsimile job, PUSH scan job: box job, or PULL scan job: remote job) the user tries to use at least now. In each job mode, an image reading color mode is selected in color mode designation (S600).

Figure 7A:
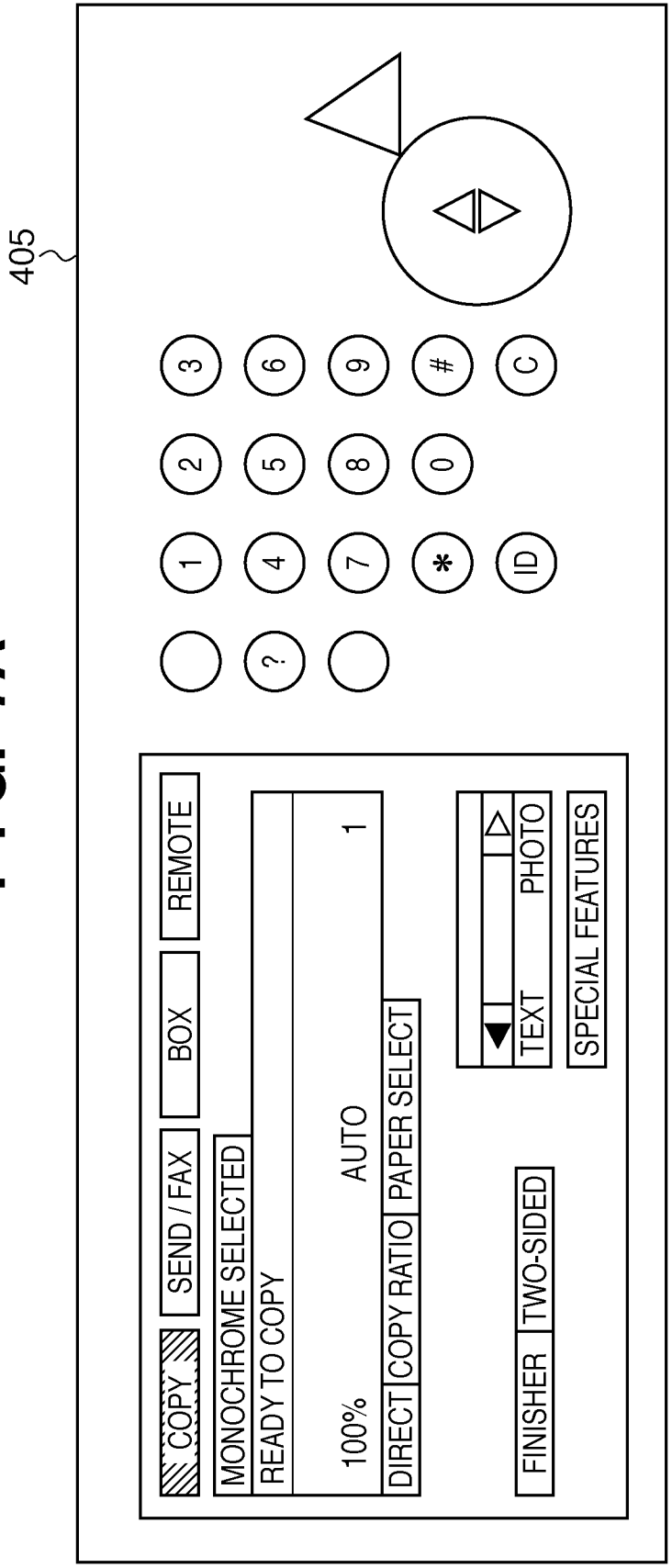
FIG. 7A is a view exemplifying the display screen of an operation unit used by a user to set a job mode in the image reading apparatus according to the embodiment.
Figure 7B:
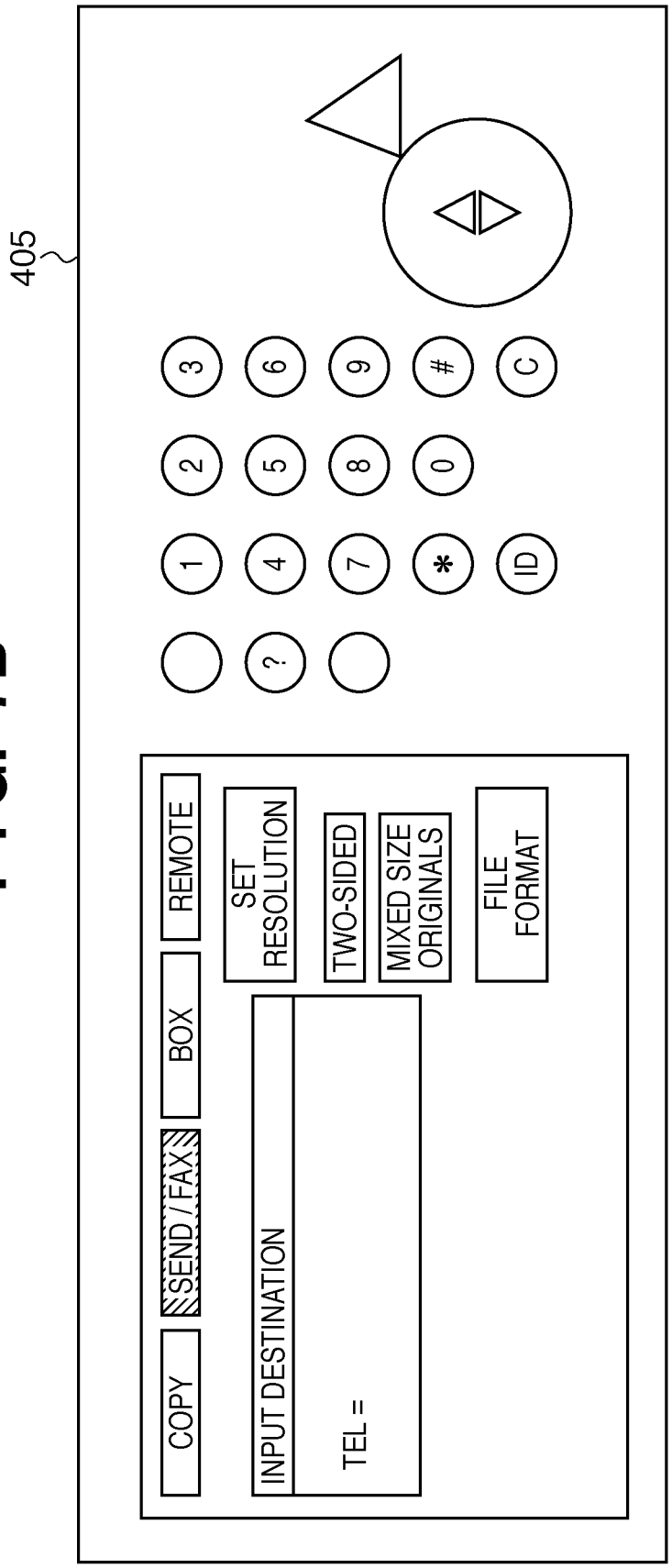
FIG. 7B is a view exemplifying the display screen of the operation unit used by a user to set a job mode in the image reading apparatus according to the embodiment.
Figure 7D:
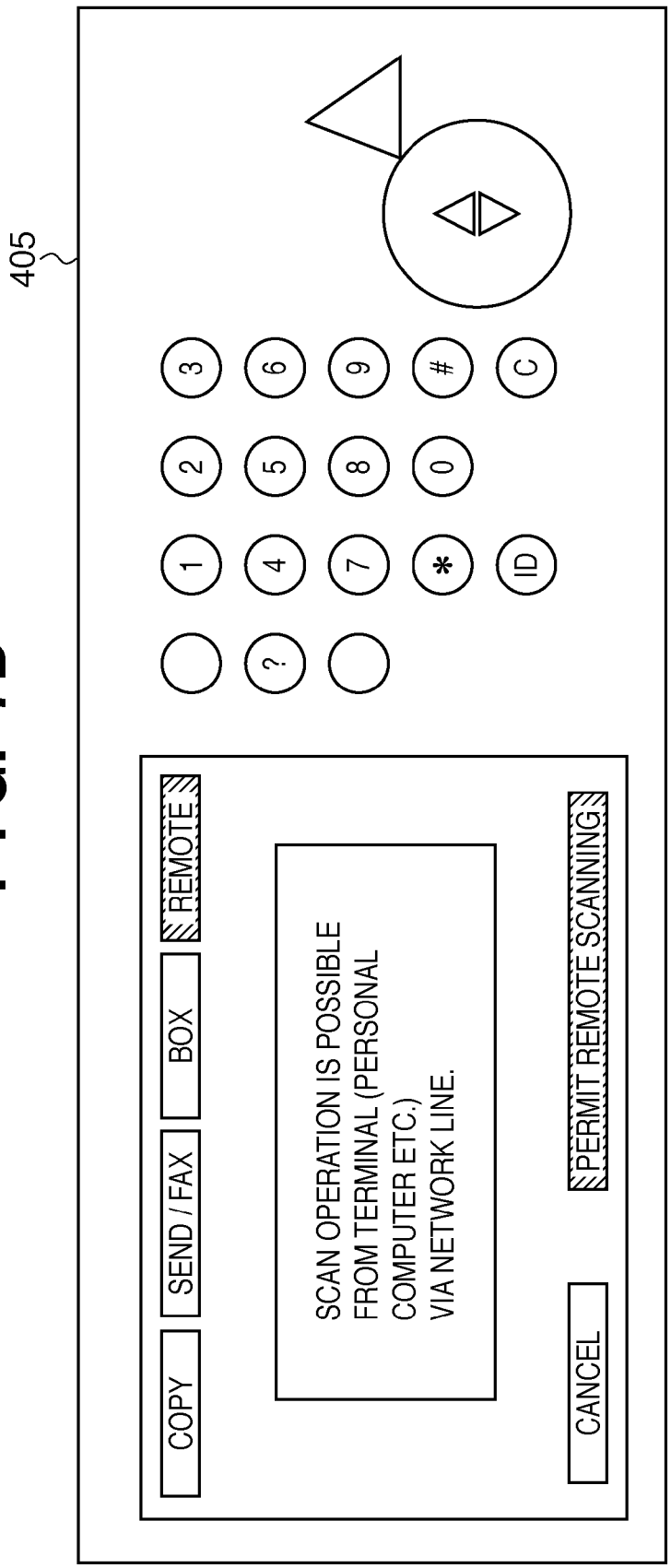
FIG. 7D is a view exemplifying the display screen of the operation unit used by a user to set a job mode in the image reading apparatus according to the embodiment.

It is determined whether a remote key is selected as shown in FIG. 7D, which is a setting for a PULL scan job (S630). Processing when the remote key is selected to designate a PULL scan job will be explained in detail later.

If the remote key is not selected and no PULL scan job is designated, it is determined in step S601 whether the FAX job mode is selected. In step S601, whether the user is to input a FAX job is determined by detecting by the control unit 401 whether the user has pressed the FAX key on the screen of the operation unit 405 to switch the screen to a FAX transmission setup screen (FIG. 7B). If the control unit 401 detects that the screen has switched to the FAX transmission setup screen, it is determined that the input job is a FAX job. Then, the process advances to a color mode designation sequence for FAX in step S604.

If the input job is not a FAX job, in step S602, whether the user is to input a copy job is determined by detecting whether the user has pressed the copy key on the screen of the operation unit 405 to switch the screen to a copy setup screen (FIG. 7A). If the control unit 401 detects that the screen has switched to the copy job setup screen (FIG. 7A), it is determined that the input job is a copy job. Then, the process advances to a color mode designation sequence for the copy job in step S605. If the input job is neither a FAX job nor copy job (e.g., the user has pressed the box key in FIG. 7C), it is determined that the input job is a PUSH scan job (S603). Then, the process advances to a color mode designation sequence for the PUSH scan job (S607).

In the color mode designation for FAX (S604), the transmission destination is basically a monochrome printout apparatus. Thus, the monochrome image mode having a shorter FCOT and a higher productivity compared to the multi color image mode is predicted and selected (S611).

Figure 8A:
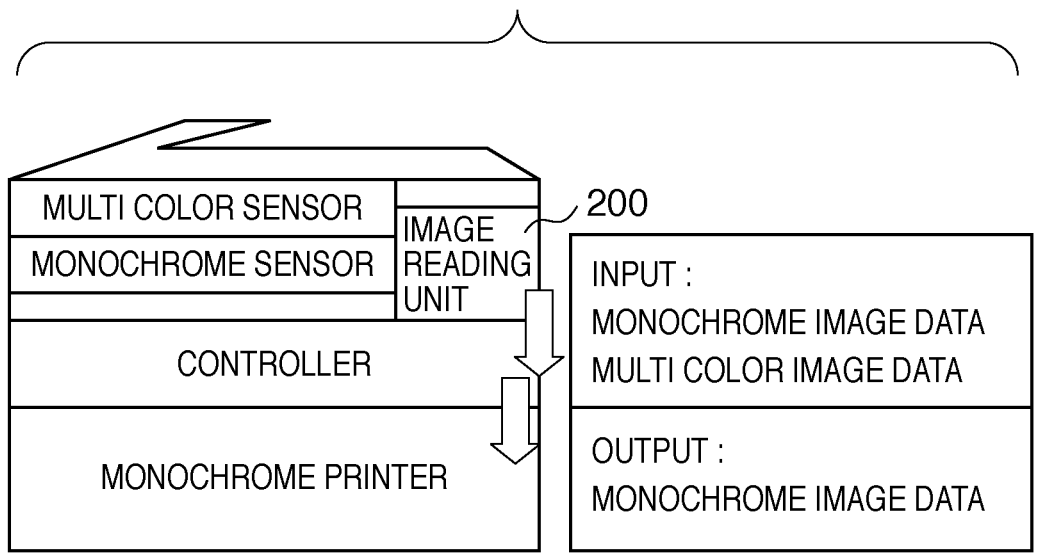
FIG. 8A is a view for explaining an example of a system configuration including the image reading apparatus according to the embodiment.

In the color mode designation for the copy job (S605), output by the copy job is always monochrome printout as long as the printer unit (image forming apparatus) connected to the image reading unit 200 is a monochrome printer, as shown in FIG. 8A. Since no image data need be read in multi color, the monochrome image mode having a short FCOT and a high productivity is predicted and selected.

Figure 8B:
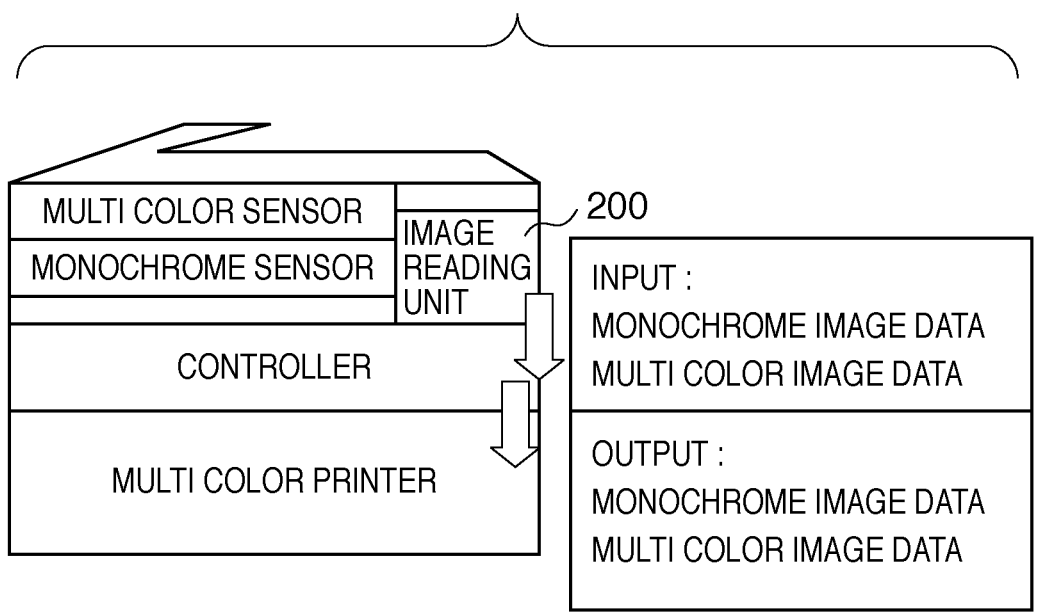
FIG. 8B is a view for explaining another example of the system configuration including the image reading apparatus according to the embodiment.

When the printer unit (image forming apparatus) connected to the image reading unit 200 is a full-color printer, as shown in FIG. 8B, it is determined whether the user has designated the monochrome image mode as a default image reading color mode on a user setup screen shown in FIG. 9 (S609). In the default color mode designation, an image reading color mode set in advance by the user is selected as a default on the screen of the operation unit 405. For example, when the monochrome image mode is selected as a default, "monochrome selected" appears as represented by the screen of the operation unit 405 for copy setting in FIG. 7A, so that the user need not select a color mode in every operation.

The selection of the monochrome image mode in FIG. 9 assumes convenience for a user who outputs most data in the monochrome image mode though the printer is full-color. If the monochrome image mode is not selected in FIG. 9, the printer is full-color and the multi color image mode is selected. If the user sets the monochrome image mode in the setting of FIG. 9, the monochrome image mode is predicted and selected (S611). If the user sets the multi color image mode, the multi color image mode is predicted and selected (S612).

If a default color mode in FIG. 9 is designated in the color mode designation sequence for the PUSH scan job in step S607, it is determined in step S609 whether the monochrome image mode is designated. If the monochrome image mode is designated, the monochrome image mode is predicted and selected (S611). If the monochrome image mode is not designated, the multi color image mode is predicted and selected (S612).

Based on the color mode predicted and selected in step S611 or S612, an image reading speed and image transfer clock are set in step S621 without waiting for a reading start instruction from the user. More specifically, if the predicted/selected color mode is the monochrome image mode, reading by the monochrome image reading CCD 211 is prepared. If the predicted/selected color mode is the multi color image mode, reading by the multi color image reading CCD 212 is prepared. If the current color mode is the same as the predicted one, neither the image reading speed nor image transfer clock is switched. If the current color mode differs from the predicted one, the image reading speed and image transfer clock are switched before reading an image. Thereafter, the process advances to the start of reading an image (S622).

If it is determined in step S608 that the user has not designated a default image reading color mode, an image reading color mode is selected based on the use log (S610). More specifically, the timing to determine a multi color image mode or monochrome image mode as a color mode can also be set freely as represented by a counter screen which displays the user log, as shown in FIG. 10. For example, the scan frequencies of past 100 jobs are stored in the image reading unit 200 as a multi color scan count $C_C$ and monochrome scan count $C_B$. Then, $C_B > C_C$ is determined (S613). Note that the scan count corresponds to the number of scanned original sheets.

If $C_B > C_C$ as a result of the determination (YES in S614), it is determined that monochrome scanning tends to be more frequent than multi color scanning (S616). Thus, the monochrome image mode is predicted and selected as a color mode (S618). If $C_B \leq C_C$ (NO in step S614), it is determined that color scanning tends to be more frequent than monochrome scanning (S615). The multi color image mode is predicted and selected as a color mode (S617).

In step S619, an image reading speed and image transfer clock are set based on the color mode predicted and selected in step S617 or 5618. More specifically, if the predicted/selected color mode is the monochrome image mode, reading by the monochrome image reading CCD 211 is prepared. If the predicted/selected color mode is the multi color image mode, reading by the multi color image reading CCD 212 is prepared. If the current color mode is the same as the predicted one, neither the image reading speed nor image transfer clock is switched. If the current color mode differs from the predicted one, the image reading speed and image transfer clock are switched before reading an image. Then, the process advances to the start of reading an image (S620).

In this fashion, a transfer clock and reading speed corresponding to a reading color mode selected by predictive determination can be switched and set till the start of a job.

(Example 3 of Color Mode Switching According to Embodiment: Color Mode Prediction by Detecting Designation from PC Terminal)

The setting in FIG. 7D on the operation unit 405 is a display on the operation unit 405 that is set when executing remote reading from a host computer 1300 connected by a network line 1310. A case in which "remote" is selected by key input designation on the operation unit 405 in FIG. 7D to execute a PULL scan job in step S630 of the flowchart of FIGS. 6A and 6B will be explained.

The PULL scan job is to designate reading of an original image directly from the host computer 1300 via a communication line such as the network line 1310 and perform an image reading operation. In the embodiment, the following two processes may concurrently occur in the controller unit 400. That is, reading of an image may start at the start of a copy job by an operation from the operation unit 405 in front of the image reading unit 200, while reading of an image starts by a PULL scan job or the like from the outside such as a network. In this situation, no job management can be done. Hence, exclusive control is done in reading an image to determine whether the job is a PULL scan job. The flowchart of FIGS. 6A and 6B is directed to a job, the start of which is designated from the operation unit 405, other than the PULL scan job. Next, processing for a PULL scan job will be described.

Figure 11:
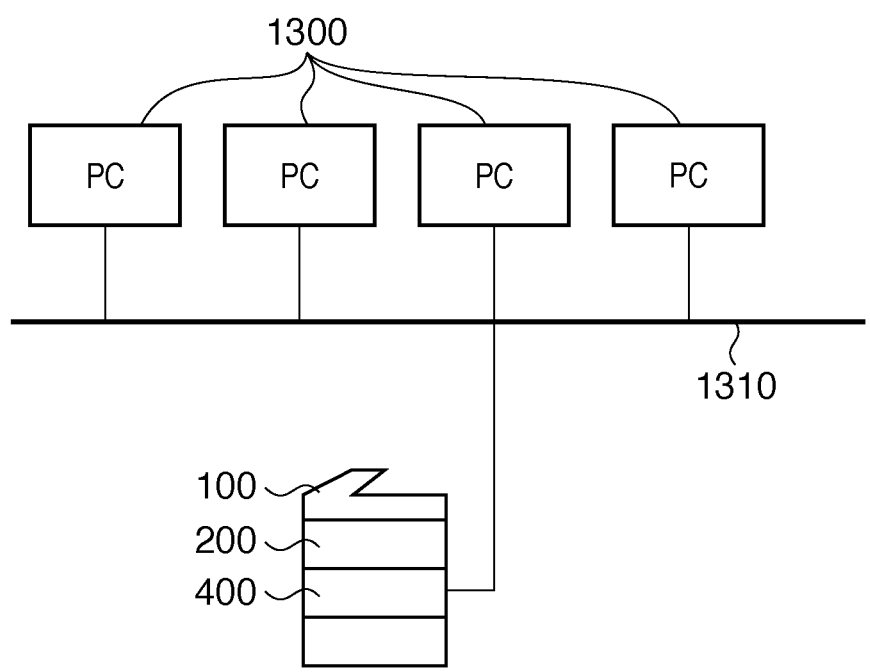
FIG. 11 is a view for explaining an example of an image reading system configuration which implements a PULL scan job function by remote control using the image reading apparatus of the embodiment, a host computer, and a network line.

FIG. 11 is a view exemplifying a system configuration which implements this example. FIG. 11 shows a connection state via the network line 1310 in which the PULL scan job is executed. The controller unit 400 of the image reading unit 200 is connected to the network line 1310. Further, the host computer, i.e., the PC terminal 1300 is connected to the network line 1310. The PC terminal 1300 can instruct the image reading unit 200 to start a PULL scan job. Instead of the network line 1310, the image reading unit 200 and PC terminal may be connected in a one-to-one configuration using a dedicated cable or the like. In this case, one PC terminal 1300 may directly designate the start of the PULL scan job.

Figure 12:
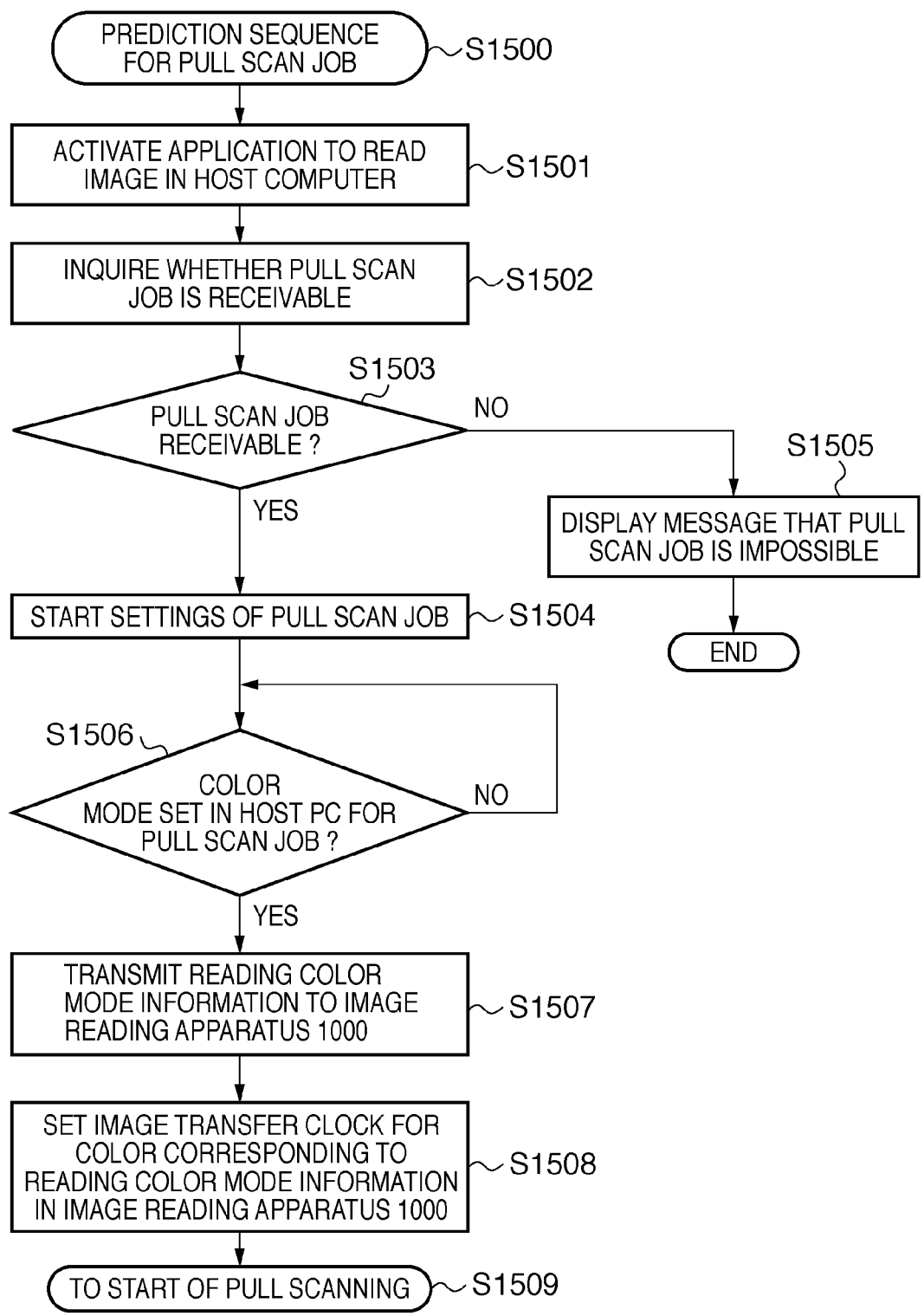
FIG. 12 is a flowchart exemplifying the sequence of a PULL scan job in the image reading system according to the embodiment.

FIG. 12 is a flowchart exemplifying a processing sequence when the PC terminal 1300 starts a PULL scan job. In FIG. 12, the PC terminal 1300 performs the processes of S1500 to S1507, and the image reading unit of the image reading apparatus executes the process of S1508. The image reading apparatus replies to an inquiry in step S1502 about whether it can receive a PULL scan job. The image reading apparatus receives reading color mode information transmitted in step S1507, and sets an image transfer clock in step S1508.

A PULL scan job (S1500) is based on an image reading instruction from any application software running on the PC terminal 1300. Thus, an application is activated (S1501). The PC terminal 1300 inquires whether the image reading unit 200 can receive the PULL scan job (S1502). Whether the image reading unit 200 can receive the PULL scan job is determined from whether the user has selected the remote setup screen (FIG. 7D) by key input to the operation unit 405 in the flowchart of FIGS. 6A and 6B.

The controller unit 400 of the image reading unit 200 performs exclusive control to determine whether the job is a PULL scan job. Therefore, unless remote setting is made, the image reading unit 200 cannot receive a PULL scan job (S1503). Thus, if no remote setting is made, the user of the PC terminal 1300 is notified of an alarm message 1405 that the PULL scan job is impossible, as shown in FIG. 13B (S1505). If the remote setting is made on the operation unit 405 of the image reading unit 200, the PULL scan job is possible, and setting of the PULL scan job starts (S1504).

Figure 13A:
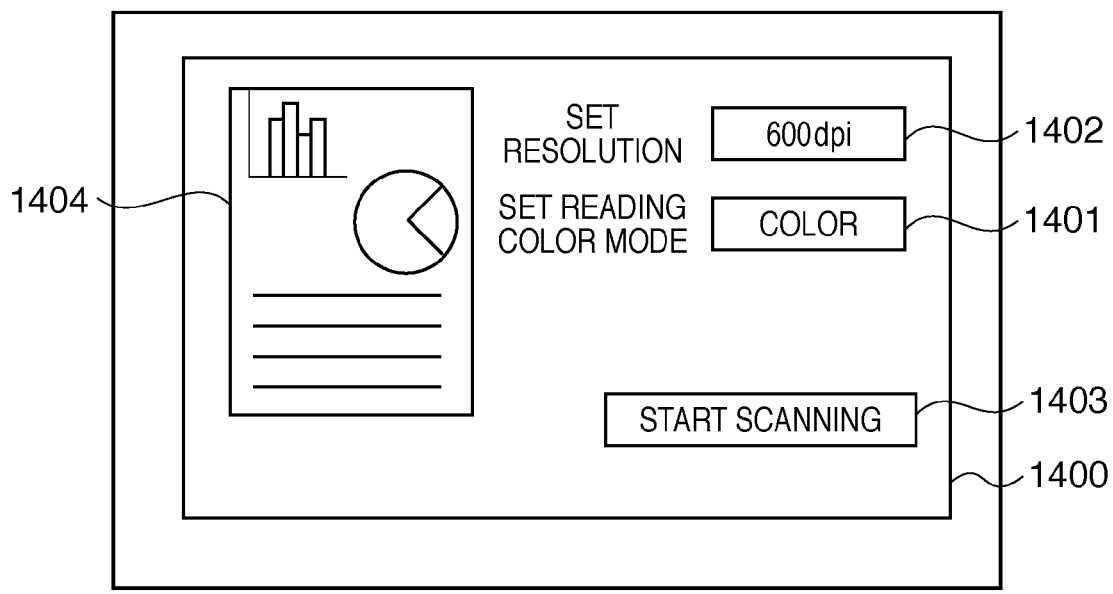
FIG. 13A is a view exemplifying a detailed scan setup screen on the host computer in the image reading system according to the embodiment.
Figure 13B:
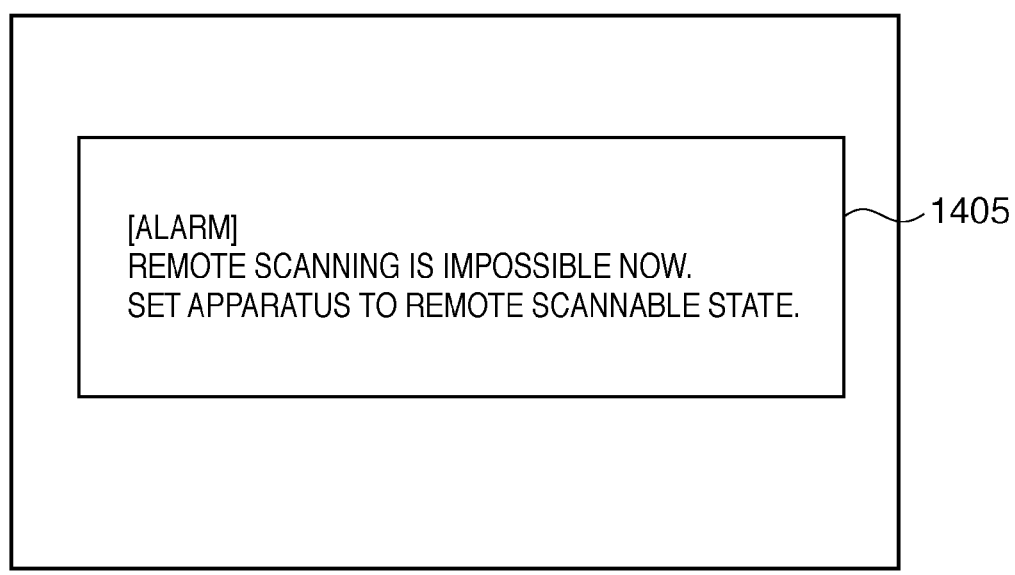
FIG. 13B is a view exemplifying an alarm notification screen on the host computer in the image reading system according to the embodiment.

FIG. 13A exemplifies a case in which the display of the PC terminal 1300 displays a reading mode setup screen in reading setting in a given application. A setup screen 1400 on the display of the PC terminal 1300 displays a setting key 1402 to set a resolution, and a setting key 1401 to set a reading color mode. The setup screen 1400 also displays a setting key 1403 to start scanning, and a setting key 1404 to preview an image scanned by image reading scanning.

Immediately before the start of a PULL scan job, the user designates any settings, similar to those immediately before the start of a copy job. These settings include the reading color mode setting on the display in FIG. 13A. As described above, a PULL scan job is executed exclusively to other jobs. Thus, the PC terminal 1300 always communicates with the controller unit 400 of the image reading unit 200 via the network line 1310 to inquire whether the image reading unit 200 can perform PULL scanning, and the PC terminal 1300 transmits/receives information. The communication is done not only at the timing to start a job, but also before the start of the job.

When the user selects the reading color mode setting key in FIG. 13A at the timing before the start of the PULL scan job (S1506), the PC terminal 1300 transmits the selected color mode information (monochrome image mode/multi color image mode) to the image reading unit 200 (S1507). In practice, the controller unit 400 of the image reading unit 200 first receives the information, and then notifies the image reading unit 200 of it. Upon receiving the reading color mode information from the PC terminal 1300, the controller unit 400 instructs the image reading unit 200 on the reading color mode in accordance with the information from the PC terminal 1300.

In step S1508, the CPU 321 of the image reading unit 200 sets an image reading speed and image transfer clock based on the designated reading color mode. If the current color mode is the same as the predicted one, neither the image reading speed nor image transfer clock is switched. If the current color mode is different from the predicted one, the image reading speed and image transfer clock are switched before reading an image. Then, the process advances to the start of PULL scanning (S1509).

Also in the PULL scan job, similar to the copy job/FAX job/PUSH scan job described with reference to the flowchart of FIGS. 6A and 6B, reading color mode information is transmitted to the image reading unit 200 before the start of the PULL scan job. Based on the reading color mode designated before the start of reading an image, the image transfer clock and reading speed can be switched and set before the start of reading (S1508). This enables quick reading by shortening the time necessary for switching without making settings again for the reading color mode after the start of the job.

(Example 4 of Color Mode Switching According to Embodiment: Color Mode Prediction at Timing to Detect Original Set on Original Tray)

Figure 14A:
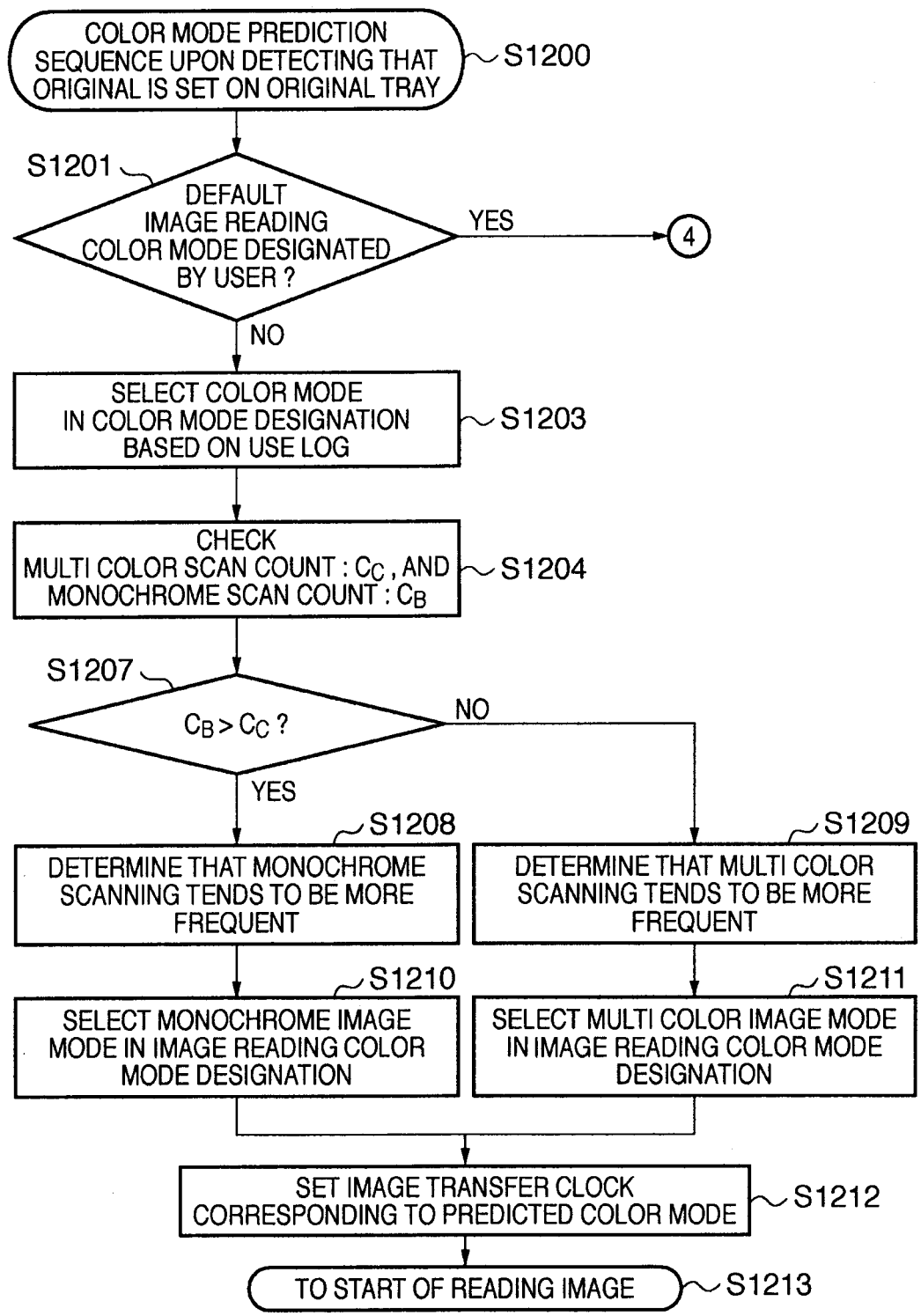
FIGS. 14A and 14B are a flowchart exemplifying prediction of an image reading color mode when an original is set in the image reading apparatus according to the embodiment.
Figure 14B:
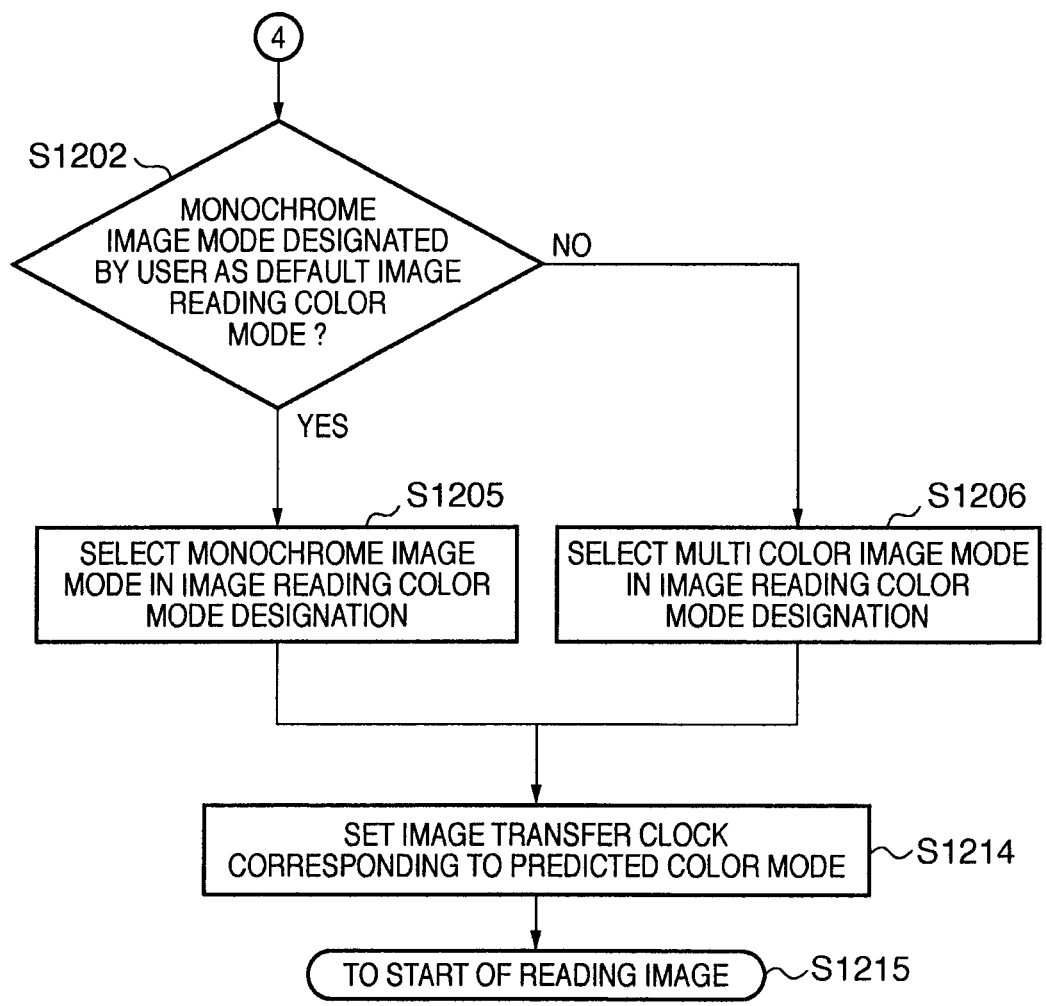

When the CPU 300 detects that an original is set on the original tray 30 of the ADF 100, the CPU 321 can be notified of it via the communication line 351. A color mode prediction method at the timing when it is detected that an original is set on the original tray 30 will be explained with reference to the flowchart of FIGS. 14A and 14B.

In prediction of an image reading color mode upon detecting that an original is set on the original tray 30 (S1200), a default image reading color mode designated by the user in FIG. 9 is checked (S1201). When a color mode has been designated, which of the monochrome image mode and multi color image mode has been designated is checked (S1202). If the monochrome image mode has been designated, the monochrome image mode is predicted and selected according to the default user setting (S1205). If the multi color image mode has been designated, the multi color image mode is predicted and selected (S1206).

In step S1214, an image reading speed and image transfer clock are set based on the color mode predicted and selected in step S1205 or S1206. If the current color mode is the same as the predicted one, neither the image reading speed nor image transfer clock is switched. If the current color mode differs from the predicted one, the image reading speed and image transfer clock are switched before reading an image. Then, the process advances to the start of reading an image (S1215).

If the user has not designated a default image reading color mode, a color mode is selected by color image designation based on the use log (S1203). Step S1203 and subsequent steps are the same as step S610 and subsequent steps in the flowchart of FIG. 6A. The image reading unit 200 stores scan frequencies as the multi color scan count $C_C$ and monochrome scan count $C_B$, and determines whether $C_B > C_C$ (S1204, S1207). If YES in S1207, it is determined that monochrome scanning tends to be more frequent than multi color scanning (S1208). Thus, the monochrome image mode is predicted and selected in reading image color mode designation (S1210). If NO in S1207, it is determined that multi color scanning tends to be more frequent than monochrome scanning (S1209). The multi color image mode is predicted and selected in image reading color mode designation (S1211).

In step S1212, an image reading speed and image transfer clock are set based on the color mode predicted and selected in step S1210 or S1211. If the current color mode is the same as the predicted one, neither the image reading speed nor image transfer clock is switched. If the current color mode differs from the predicted one, the image reading speed and image transfer clock are switched before reading an image. Then, the process advances to the start of reading an image (S1213).

In this way, a transfer clock and reading speed corresponding to a color mode selected by predictive determination are switched and set till the start of a job.

<Example of Job Sequence After Predictive Designation of Image reading Color Mode According to Embodiment>

In the examples described above, a color mode is predictively determined, and the image reading speed and image transfer clock are switched before the start of reading an image.

Figure 15:
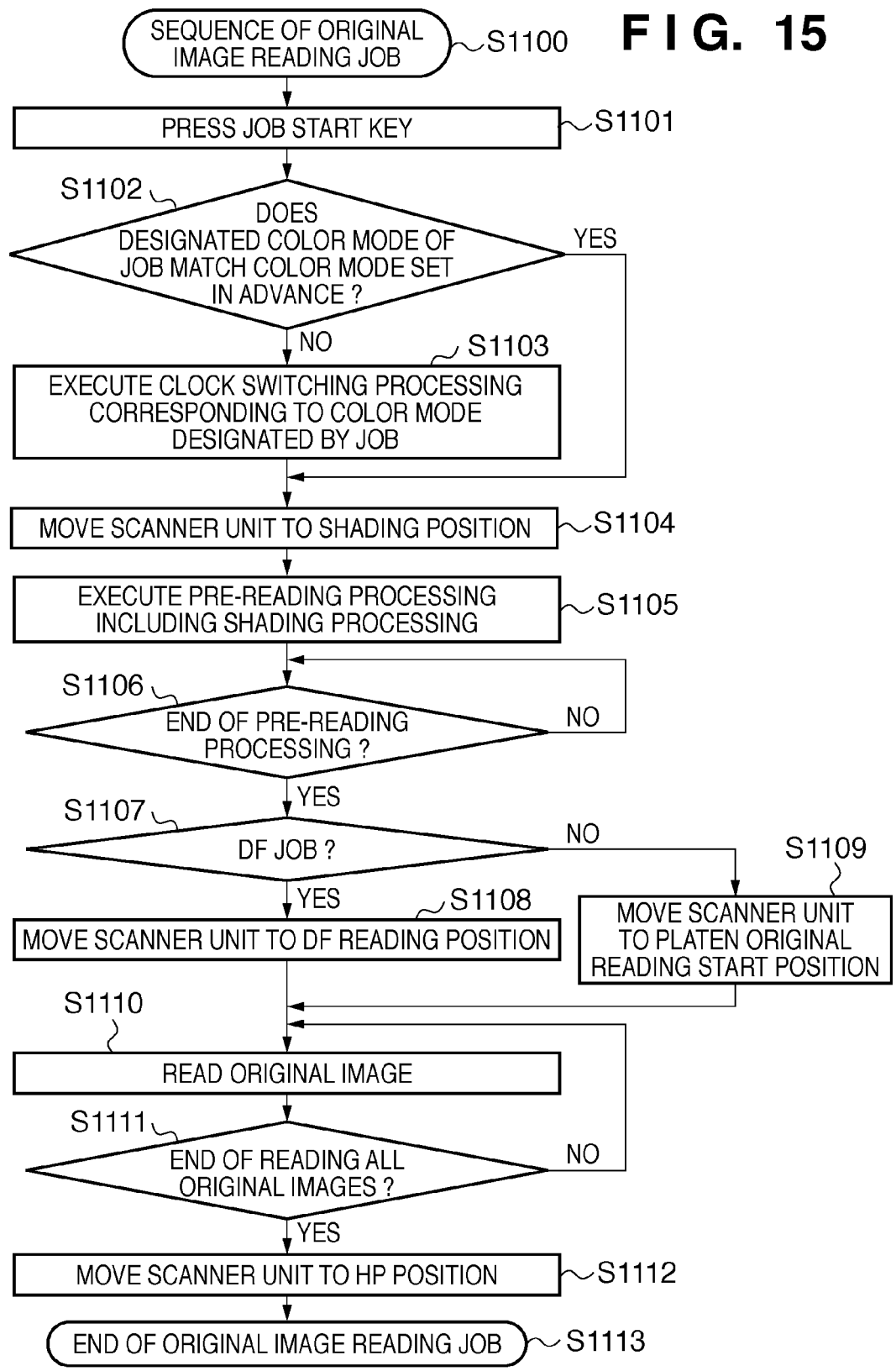
FIG. 15 is a flowchart exemplifying a sequence after the start of reading in the image reading apparatus according to the embodiment.

FIG. 15 is a flowchart exemplifying a processing sequence after the start of reading. FIG. 15 will explain a setting example of a color mode which can be predicted from a key input from the operation unit 405 by using the key input from the operation unit 405 as a trigger when the user inputs a key from the operation unit 405 to set various modes of a job in FIGS. 6A and 6B. This also applies to predictive setting of another color mode.

FIG. 15 shows an original image reading job sequence which starts upon pressing a job start key, for example, a copy start key on the operation unit 405. To start the original image reading job sequence (S1100), the user presses a job start key, like the copy start key, to input a reading start instruction (S1101).

Although not shown, after the start of the job, the control unit 401 of the controller in FIG. 2A interprets the setting input to the operation unit 405, and notifies the CPU 321 of the image reading unit 200 of the interpreted setting as a job mode via the controller/interface control communication line 352. The CPU 321 confirms the job setting mode, and determines whether a color mode for which the clock has been switched in advance in response to the key input matches a color mode actually set as one job mode setting at the start of the job (S1102). If the color mode for which the image transfer clock has been switched at the key input timing matches a color mode finally designated by the user, the CPU 321 determines that the clock setting processing has ended, and the scanner unit moves to a shading position (S1104). If the color mode for which the image transfer clock has been switched does not match a color mode finally designated by the user, the CPU 321 switches the image transfer clock for the user-designated color mode (S1103).

After the scanner unit moves to the shading position (S1104), pre-processing is executed, including shading processing (S1105). The process waits till the end of pre-reading processing (S1106). After the end of pre-reading processing, it is determined whether the current job is a DF (document feeder) job (S1107).

If the current job is a DF job, the scanner unit moves to a DF reading position (S1108). If the current job is a platen original reading job, the scanner unit moves to a platen original reading position (S1109). Then, reading starts (S1110). The end of reading all original images is confirmed (S1111). After the end of reading all original images, the scanner unit moves to a HP (home position) (S1112), ending the original image reading job (S1113).

In the flowchart of FIGS. 6A and 6B, a color mode is predicted so that a color mode at the start of a job properly matches one set at the timing of each mode setting key operation input immediately before the start of the job. Even by the color mode prediction, the monochrome image mode can be almost specified for a FAX job or a monochrome printer.

Such a job can be detected and determined at the timing when the user sets it by key input from the operation unit 405. As a consequence, a color mode set at the timing of the key operation input can be made to appropriately match one at the start of the job. The trend of the color mode is predicted from the use log of the user (see FIGS. 6A, 6B, 14A and 14B). This allows a color mode at the start of a job to optimally match one set at the timing immediately after each mode setting key operation input immediately before the start of the job or one at the timing immediately after an original is set on the original tray 30.

When the user designates a default color mode, the color mode is highly likely to be set for jobs. Hence, a color mode at the start of a job can optimally match one at the timing (see FIGS. 6A and 6B) immediately after key input by the user from the operation unit 405 and one at the timing (see FIGS. 14A and 14B) immediately after detecting that an original is set.

At the timing immediately after key input from the operation unit 405 or the timing after detecting that an original is set, an image reading speed and image transfer clock are switched in advance in accordance with the color mode. The processing to switch the image transfer clock and image reading speed can be omitted for a color mode immediately after the start of a job in step S1103. Consequently, an image reading apparatus with a shorter FCOT can be provided.

Other Embodiment

The above-described embodiment has exemplified an apparatus having a scanner unit for reading only the obverse side. This also applies to an apparatus having a scanner unit for reading the reverse side, in addition to that for reading the obverse side.

Figure 16:
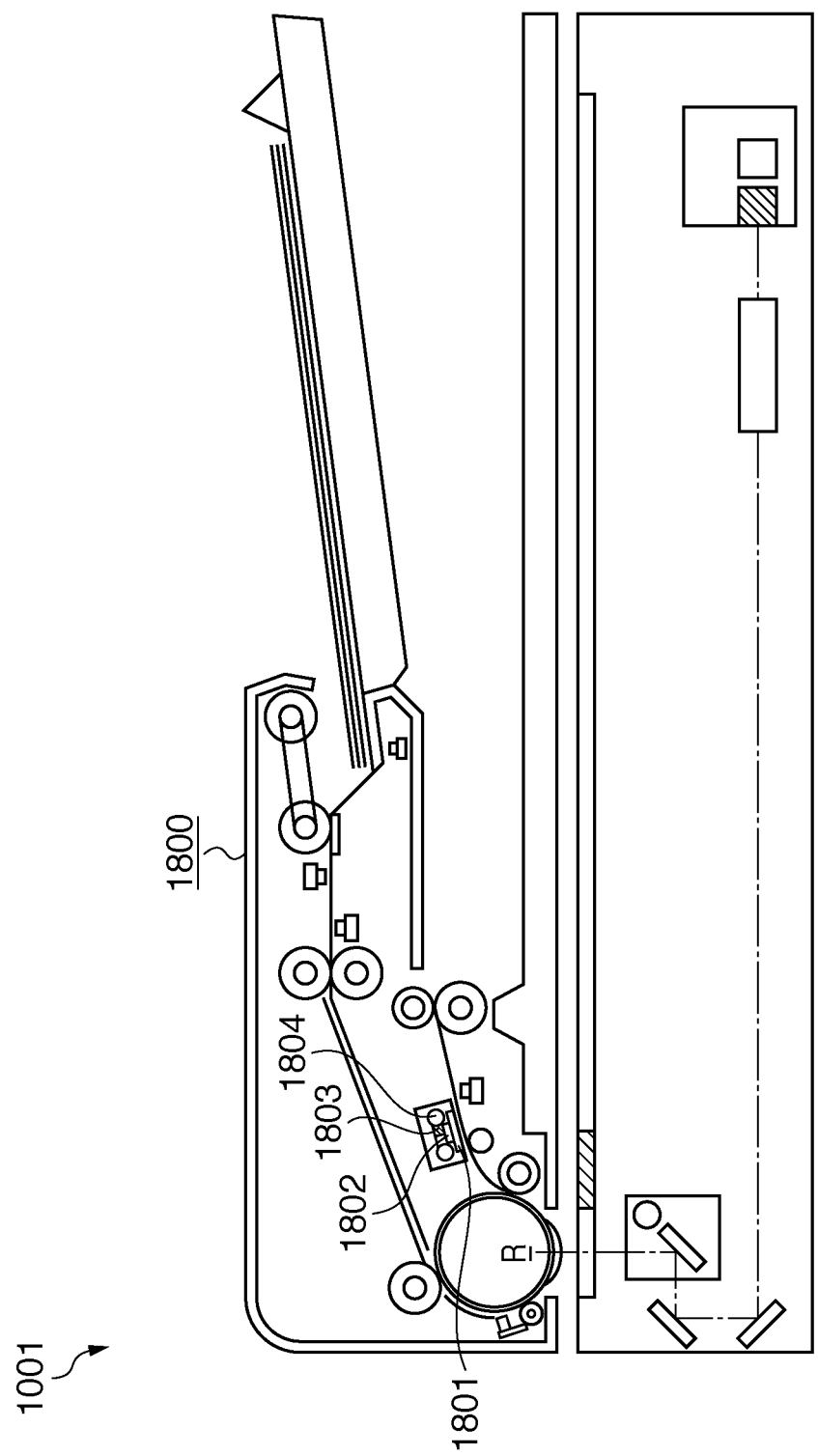
FIG. 16 is a sectional view exemplifying an image reading apparatus according to another embodiment.

FIG. 16 is a sectional view showing an automatic document feeder 1800 including a reverse-side scanner unit. An image reading apparatus 1001 in FIG. 16 has almost the same structure as that of the image reading apparatus 1000 shown in FIG. 1. The automatic document feeder 1800 in FIG. 16 includes a reverse-side scanner unit 1801, unlike the automatic document feeder in FIG. 1. The automatic document feeder 1800 can read two sides of an original without reversing it on the original conveyance path.

The reverse-side scanner unit 1801 incorporates a multi color image reading CIS 1802, monochrome image reading CIS 1803, and lamp 1804, and can covert an image signal into image data. In the reverse-side scanner unit 1801 in two-side reading, an arrangement which requires a certain time for clock switching processing is the same as that in an obverse-side reading scanner unit.

A determined reading color mode is selected in step S612, S611, S617, or S618 in the flowchart of FIGS. 6A and 6B. Then, an image reading speed and image transfer clock are switched and set in accordance with a color mode selected for the obverse-side and reverse-side image reading scanner units at the timing of key input from the operation unit 405. For a two-side reading job, both the obverse and reverse sides are read basically in the same color mode. Even after the start of the two-side job using the reverse-side scanner unit, the same processing is done for the obverse-side and reverse-side image reading scanner units, similar to the obverse-side scanner unit. A color mode designated in the job mode and a color mode set at the timing of key input from the operation unit 405 are confirmed for each scanner unit. If these color modes match each other, switching of the clock following switching of the color mode can be omitted for both the obverse-side and reverse-side scanner units at the start of the job. This can shorten the time taken to switch the clock. An image reading apparatus with a shorter FCOT can therefore be provided even in two-side reading control using an arrangement having obverse-side and reverse-side scanner units.

The present invention may be applied to a system including a plurality of devices or an apparatus formed by a single device, like a scanner, printer, PC, copying apparatus, multi-function peripheral, or facsimile apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-300185, filed on Nov. 25, 2008, which is hereby incorporated by reference herein in its entirety.

What is claimed is:

1. An image reading apparatus which includes a multi color line sensor and a monochrome line sensor, a parameter for reading by the multi color line sensor being different from a parameter for reading by the monochrome line sensor, said image reading apparatus comprising:

a prediction unit configured to predict, prior to an input of an original reading start instruction, whether to read an original image in a monochrome reading mode in which the image reading apparatus reads the original image in use of the monochrome line sensor or a multi color reading mode in which the image reading apparatus reads the original image in use of the multi color line sensor;

a setting unit configured to set, prior to the input of the original reading start instruction, the parameter for reading the original by the multi color line sensor without waiting for the input of the original reading start instruction in a case where said prediction unit predicts the multi color reading mode, and to set the parameter for reading the original by the monochrome line sensor without waiting for the input of the original reading start instruction in a case where said prediction unit predicts the monochrome reading mode;

a determination unit configured to determine whether a reading mode predicted by the prediction unit matches a reading mode designated for reading the original in response to the input of the original reading start instruction; and a change unit configured to change the parameter set by the setting unit to the parameter corresponding to the reading mode designated for reading the original if the reading mode predicted by the prediction unit does not match the reading mode designated for reading the original.

2. The apparatus according to claim 1, wherein the parameter includes a parameter for controlling a speed for reading the original image.

3. The apparatus according to claim 1, wherein the parameter includes a parameter for controlling a frequency of a clock for transferring image data corresponding to the read original image.

4. The apparatus according to claim 1, wherein said prediction unit starts the prediction of the reading mode in response to setting of an operation job by a user.

5. The apparatus according to claim 1, wherein said prediction unit starts the predicting of the reading mode in response to a detection of setting the original on an original tray.

6. The apparatus according to claim 1, wherein said prediction unit predicts a default reading mode set by a user through an operation unit as the reading mode in which the image reading apparatus starts reading the original.

7. The apparatus according to claim 1, further comprising:
- an adjustment unit configured to perform an adjustment for reading a multi color image and to perform an adjustment for reading a monochrome image when the image reading apparatus is activated; and
- a change unit configured to change a sequence of the adjustment for reading a multi color image and the adjustment for reading a monochrome image in correspondence with the reading mode predicted by said prediction unit when the image reading apparatus is activated.

\* \* \* \* \*